United States Patent [19]
Wang

[11] Patent Number: 5,789,841
[45] Date of Patent: Aug. 4, 1998

[54] AXIAL AIR GAP BRUSHLESS MOTOR WITH LAYERED DISK STATOR

[75] Inventor: Xin Tian Wang, Central Islip, N.Y.

[73] Assignee: Kollmorgen Corporation, Waltham, Mass.

[21] Appl. No.: 643,204

[22] Filed: May 2, 1996

Related U.S. Application Data

[63] Continuation-in-part of Ser. No. 484,823, Jun. 7, 1995, abandoned.

[51] Int. Cl.$^6$ .................................................. H02K 17/42
[52] U.S. Cl. ..................... 310/179; 310/180; 310/189; 310/206; 310/207; 310/216
[58] Field of Search .............................. 310/156, 154, 310/179, 268, 198, 180, 206, 207

[56] References Cited

U.S. PATENT DOCUMENTS

| | | | |
|---|---|---|---|
| Re. 31,278 | 6/1983 | Schmider | 310/268 |
| 3,144,574 | 8/1964 | Henry-Baudot | 310/268 |
| 3,488,539 | 1/1970 | Tucker | 310/268 |
| 3,566,727 | 3/1971 | Weiss et al. | 83/50 |
| 3,624,439 | 11/1971 | Tokutomi | 310/154 |
| 3,989,969 | 11/1976 | Lazaroiu et al. | 310/268 |
| 4,007,390 | 2/1977 | Muller et al. | 310/90 |
| 4,072,881 | 2/1978 | Ban | 318/138 |
| 4,125,792 | 11/1978 | Schmider | 310/268 |
| 4,228,384 | 10/1980 | Arnold, Jr. et al. | 318/254 |
| 4,360,751 | 11/1982 | Arnold, Jr. et al. | 310/60 R |
| 4,982,130 | 1/1991 | Cap et al. | 310/268 |
| 5,117,141 | 5/1992 | Hawsey et al. | 310/114 |
| 5,177,389 | 1/1993 | Schalk | 310/171 |
| 5,349,259 | 9/1994 | Kaneko et al. | 310/261 |

FOREIGN PATENT DOCUMENTS

| | | |
|---|---|---|
| 0 236 763 A1 | 9/1987 | European Pat. Off. . |
| 0 624 945 A1 | 11/1994 | European Pat. Off. . |

*Primary Examiner*—Steven L. Stephan
*Assistant Examiner*—Tran N. Nguyen
*Attorney, Agent, or Firm*—Morgan & Finnegan

[57] ABSTRACT

An axial airgap brushless motor including a rotor having a plurality of permanent magnet poles, and a stator having a plurality of conductor layers and a connecting layer for connecting the conductor layers. The motor is operated by exciting the conducting layers with three phase electric current. The current gives rise to conductor magnetic fields which interact with the rotating magnetic field of the permanent magnets. The magnets are spaced relative to one another to minimize the odd harmonics to thereby minimize torque ripple.

24 Claims, 23 Drawing Sheets

AXIAL AIR GAP BRUSHLESS MOTOR WITH LAYERED DISK STATOR

CROSS-REFERENCE TO RELATED APPLICATION

This application is a continuation-in-part of commonly assigned U.S. patent application Ser. No. 08/484,823 filed on Jun. 7, 1995 now abandoned.

FIELD OF INVENTION

This invention relates to brushless electric motors, and more particularly to such electric motors of the type having a disc stator winding.

BACKGROUND OF THE INVENTION

Axial airgap brushless motors are known. See, e.g., U.S. Pat. No. 4,228,384 to Arnold and Geiger, entitled "Brushless DC Printed Motor". Such motors include a three phase stator winding and rotating permanent magnets. If used as a brushless DC motor, the motor structure preferably includes a shaft position encoder and a switching array to energize the stator winding synchronously with the shaft rotation. The stator winding in the Arnold et al. patent is basically the same as a continuous closed armature winding for a brush type motor except that the continuous winding is cut at six locations to form six sets of coils. The winding is energized through manually soldered conductors connected to the cut ends. Such motors were difficult to mass produce with automatic production facilities.

These motors have also suffered from a higher than desirable torque ripple. Motors according to the Arnold et al. patent do not provide a sinusoidal magnetic flux distribution, resulting in relatively large odd harmonics which cause larger than desired torque ripple.

SUMMARY OF THE INVENTION

The present invention provides a winding pattern that produces a sinusoidally distributed back emf in an axial airgap brushless motor, allows for the cancellation of torque harmonics, and facilitates the necessary winding interconnections.

A preferred axial airgap brushless motor according to the present invention includes: a rotor having a plurality of permanent magnet poles; a stator having a plurality of conductor layers forming winding sections; and a connecting layer for interconnecting the winding sections formed by the conductor layers. In the most preferred embodiment, the motor is operated by exciting radial conductors in the conducting layers with three phase electric current. The current flow through the stator winding creates a rotating magnetic field which interacts with the magnetic field of the rotating permanent magnets to provide an AC synchronous motor. If torque is applied to the rotor, the machine functions as an alternator. If a rotor position sensor is added and a suitable controller used, the motor can be operated as a brushless DC motor (often referred to as an AC servo motor). The same stator structure can also be used to form an induction motor.

A winding according to the invention requires at least two conductive layers interconnected in a wave configuration. The radial conductors crossing each pole face are divided into three groups, each group spanning approximately ⅓ of the pole face, or 120 electrical degrees. A half-phase winding is formed by interconnecting successive radial conductors, the location of the successive conductors alternating between layers. A pair of such half-phase windings make up the winding for a complete phase of the motor. Six half-phase windings cover all the pole faces in the two layers and, when interconnected, make up a three phase motor winding. Additional pairs of conductor layers in wave configuration can be added and connected in parallel. Alternatively, additional conductor layer pairs in lap configuration can be added and connected in series.

A three phase motor winding according to the invention consists of six half-phase windings. Each of the half-phase windings must have a free pair of end taps so that these windings can be interconnected through a connecting layer. According to one embodiment suitable for stamping, etching and the like, the taps on the inside diameter are evenly spaced according to the number of coils in the winding whereas the taps on the outside diameter are spaced according to the number of coils plus six. The closer angular spacing of the outer taps is required to provide space for the free end taps. Conductors on the additional connecting layer interconnect the free taps of the six half-phase windings to form a three phase motor winding with current flow in the correct direction through each group of radial conductors. According to another preferred embodiment, the conductor pattern is created by a notching operation with certain conductors thereafter being removed to provide free end taps for interconnecting the windings. For an eight pole motor with a progressive winding, best results are achieved with 105, 129, 153, 177, or 201 radial conductors per layer. For a retrogressive eight pole design, best results are achieved with 111, 135, 159, or 183 conductors per layer.

The motor according to this invention can be designed to substantially eliminate torque ripple. Conventional brushless motor designs commonly use permanent magnet arrangements that provide a trapezoidal flux distribution resulting in significant torque ripple. Motors according to the invention preferably use circular, high-energy, Ne/B/Fe magnets to minimize the size of the air gap and to provide a magnetic flux distribution closer to the preferred sinusoidal distribution. The undesirable torque ripple is caused by the odd harmonic distortion of the magnetic field distribution. The third harmonic tends to cancel out in a three phase motor design. It has been found according to the invention that the fifth and higher odd harmonics can be reduced or eliminated by providing a nominal gap spacing between adjacent magnets. A gap of at least 6% between adjacent magnets is preferred and cuts the fifth and higher harmonics by at least a factor of two. The most preferred nominal gap between magnets is approximately 10%. The higher odd harmonics can be further reduced by shifting some of the magnets to provide an uneven spacing between adjacent magnets. A preferred arrangement in an eight pole motor is to shift the adjacent magnets of an opposed pair to reduce the gap between the adjacent magnets. With a nominal spacing of about 10%, for example, optimum results are achieved at about a 7% shift.

DETAILED DESCRIPTION

Figure 1:
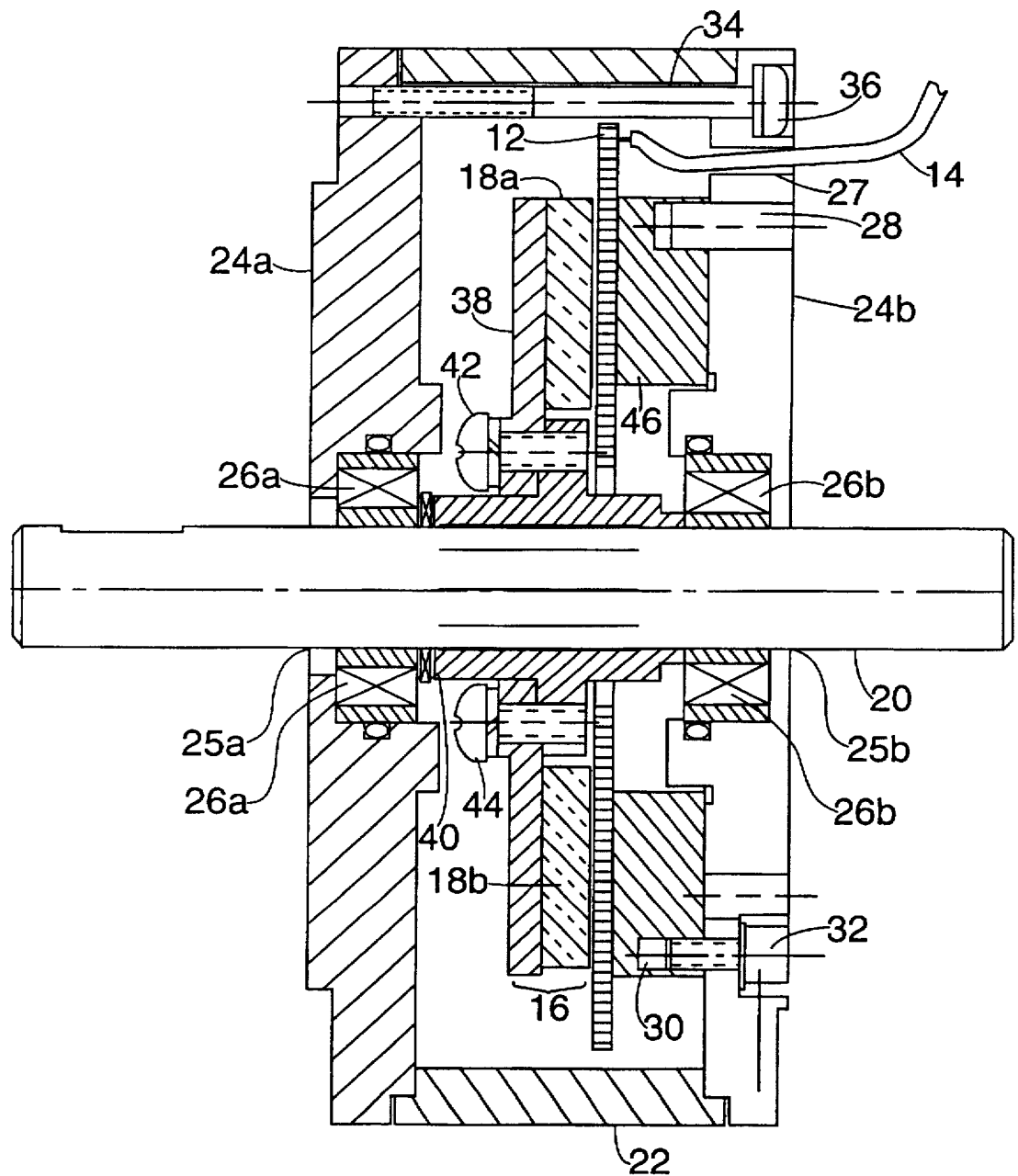
FIG. 1 is a cross-section of an axial airgap brushless motor in accordance with the present invention.

An exemplary embodiment of the present invention is an axial airgap brushless motor. FIG. 1 is a cross-section of an eight pole axial airgap brushless motor in accordance with the invention. The motor includes: a stator 12, including a stator winding energized by one or more conductors 14; a rotor 16, including permanent magnets 18a and 18b affixed thereto; and a shaft 20. The stator winding is constructed using several conductor layers and an interconnection layer. Multi-phase current supplied by conductors 14 flows through the stator winding creating a rotating magnetic field. The rotating magnetic field interacts with the magnetic field of the permanent magnets to turn the rotor, thereby turning the shaft which is affixed to the rotor.

The motor is enclosed in a housing which includes a cylindrical shell 22 and endplates 24a and 24b. The housing is made of an iron material which provides a shield to prevent radiation of electromagnetic interference. Endplate 24a has a through hole 25a to accommodate the shaft and a bearing 26a. Endplate 24b has a through hole 25b which accommodates the shaft and a bearing 26b. Endplate 24b further includes a through hole 27 for conductors 14 for energizing the stator winding. Threaded holes 28 and 30 accommodate bolts 32 for securing the annular flux return plate 46 to the stator endplate 24b. Fasteners, such as long bolt 36, are used for securing the endplates to the cylindrical shell.

The rotor of FIG. 1 includes a collar 40 secured to the shaft, and a flux return plate 38 secured to the collar by bolts 42 and 44. The flux return plate provides a base for mounting the permanent magnets and provides a flux return path for the magnets. Similarly, an annular iron plate 46, provides a flux return path for the stator winding. The stator winding 12 is secured to plate 46.

Figure 2:
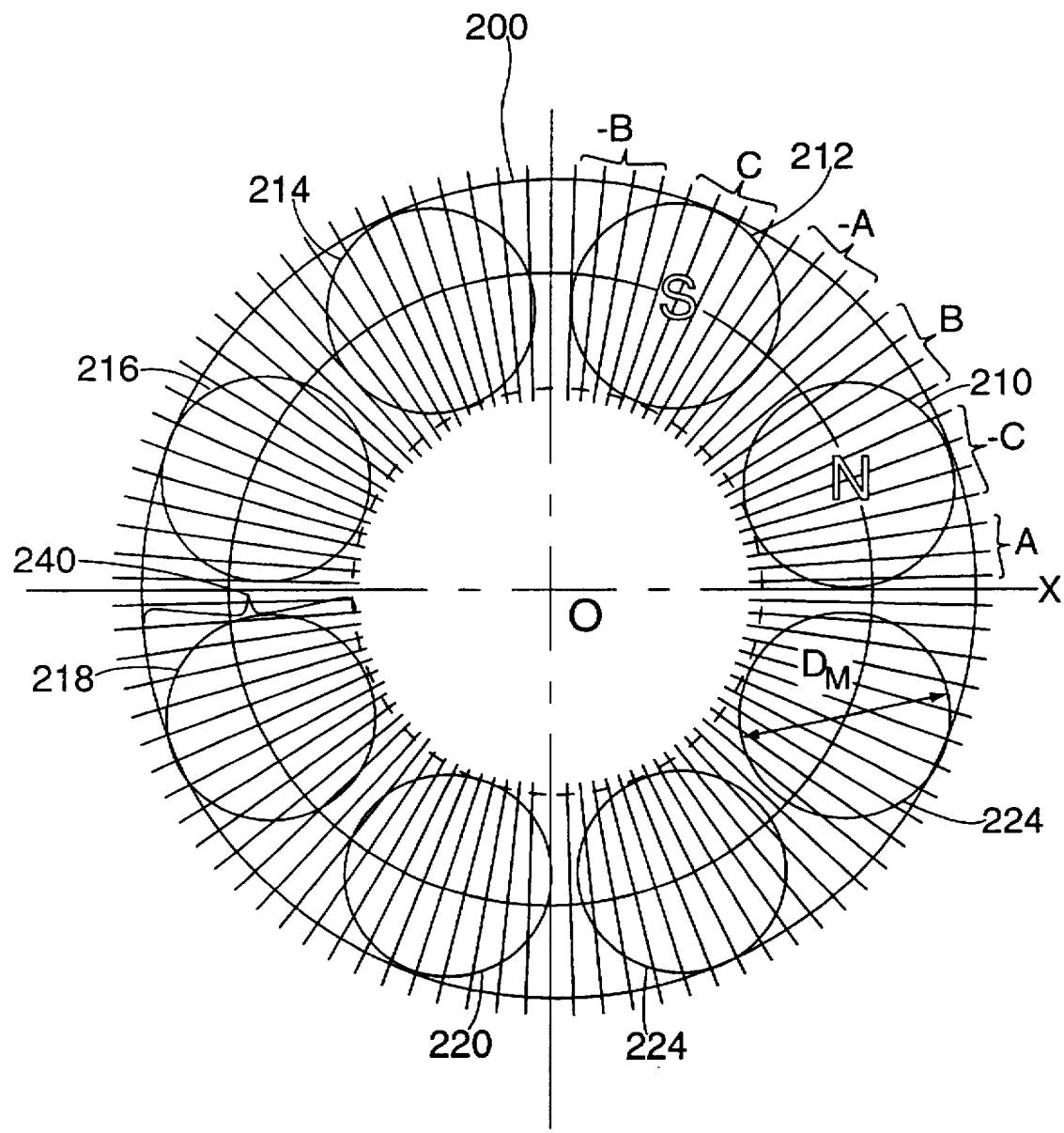
FIG. 2 is a conceptual representation of an axial airgap brushless motor in accordance with the present invention.

A conceptual representation of the stator winding is shown in FIG. 2, which depicts a stator made up of generally radially extending winding segments (e.g., segment 240). The winding segments are distributed evenly about an annular area. Superimposed on the segments are eight circles 210–224 indicating the relative positions of the rotor magnet poles.

The stator winding is fabricated in layers. Each layer includes generally radially extending winding segments connected to winding segments of another layer to make up the phase windings. The phase windings are interconnected using a connecting layer to form a completed stator winding.

There are many techniques through which the individual layers of the stator may be constructed. Among these techniques are the well known techniques of printed circuit construction, such as etching, plating, printing and pressure bonding - collectively termed "printing techniques". See generally Printed Circuits Handbook (Clyde F. Coombs, Jr. ed. 1967). Another technique suitable for forming the conductor layers involves stamping the conductor pattern out of a copper sheet. Still another technique is the multi-wire technique, whereby conductor layers are formed by bonding insulated wire to a substrate. The most preferred technique is to form the conductor layers through a notching operation wherein a copper sheet is indexed and the metal between adjacent winding segments is notched out in successive operations. For a more detailed description of the single stamp and notching operations see U.S. Pat. No. 3,488,539.

Figure 3A:
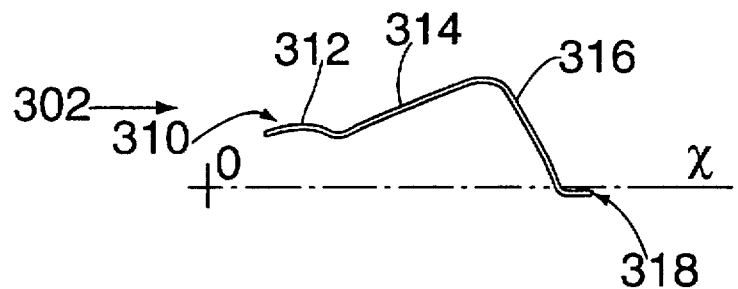
FIG. 3A illustrates a first winding segment according to the invention.
Figure 3B:
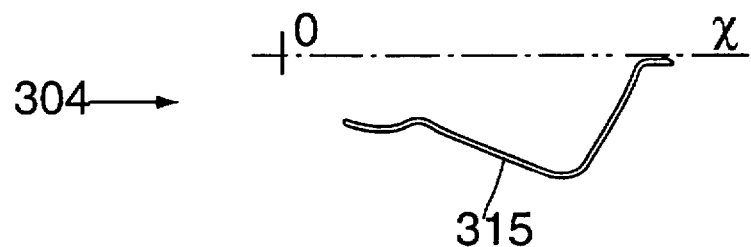
FIG. 3B illustrates a second winding segment according to the invention.
Figure 3C:
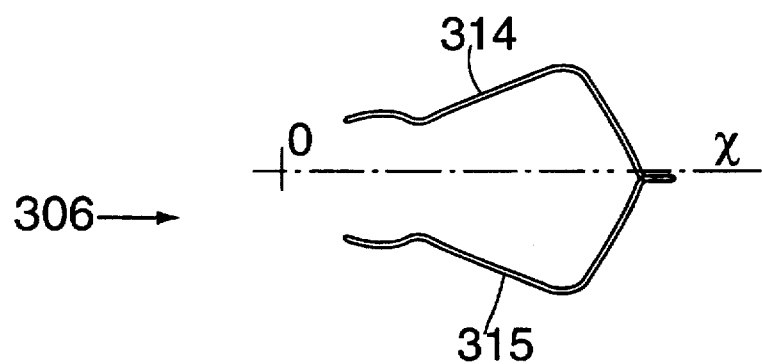
FIG. 3C illustrates a coil formed by combining the winding segments of FIGS. 3A and 3B.

FIGS. 3A–3C illustrates how winding segments in different layers form a winding coil. FIG. 3A shows a first winding segment 302 that is part of a first layer (layer 1). Segment 302 includes: an inner tap 310, an inner wrap 312, an effective radial conductor 314, an outer wrap 316, and an outer tap 318. FIG. 3B shows a winding segment 315 in another layer (layer 2) which is a mirror image of the winding segment in FIG. 3A. As can be seen from FIG. 3C, the outer tap of segment 302 may be joined to the outer tap of segment 304 to form a winding coil 306. Segment 302 and 304 include effective radial conductors 314 and 315, respectively, and form coil 306 with two radial conductors. In a similar manner, the remaining segments in layer 1 are interconnected with the segments of layer 2 to form the stator winding.

The coil depicted in FIG. 3C is a coil for a wave winding. That is, for a pair of segments (segment 302 and segment 304, for example) the angular displacement between the inside tap and the outside tap is approximately equal to a half of the coil span. A coil for a lap winding may be constructed from winding segments similar to segments 302 and 304 except that the inner wrap involutes are located such that the inner taps are approximately aligned with the outer taps.

For the preferred stator winding according to the invention, the design should satisfy the following conditions:

(1) The conductor layers making up the phase windings should be physically identical.

(2) The connections between conductor layers should be provided by a separate connecting layer.

(3) For a three phase winding, the phase windings should be shifted relative to each other by 120° electrically and 120° mechanically.

(4) The effective radial conductor portion of each segment should be oriented in the radial direction relative to the stator's center.

(5) The two effective radial conductor portions of a coil should have a span that is approximately equal to the diameter of a pole.

A computer simulation of an 8 pole motor according to the present invention revealed that the foregoing design conditions can best be satisfied with particular numbers of segments per layer. When the allowable range of segments in a layer is within the range of 100 to 220, the number of segments which best satisfy the conditions are 105, 129, 153, 177 and 201, for a progressive winding; and 111, 135, 159 and 183, for a retrogressive winding.

In an exemplary embodiment, the motor winding has 5 layers, including 4 conductor layers and one connection layer. The layers are counted bottom to top. Layers 1 to 4 include the radial conductor segments that form the phase windings. Layer 5 is the connecting layer for interconnecting the separate phase windings. In a parallel winding (wave only), layers 1 to 4 are in a wave configuration and are physically the same. In a series winding, layers 1 and 2 are in a wave configuration and layers 3 and 4 are in a lap configuration. In the figures hereinafter discussed a top view is shown. Layers 1 and 2 are physically identical, but one layer is inverted relative to the other so that the layers as they appear in the drawings are mirror images of one another. Layers 3 and 4 are similarly inverted relative to one another.

In a preferred embodiment, the motor is a three phase motor. The motor winding is made up of six half-phase windings: a +A half-phase winding, a +B half-phase winding, a +C half-phase winding, a –A half-phase winding, a –B half-phase winding, and a –C half-phase winding. The total number of coils in the motor is Z, and therefore the total number of segments in the motor is 2*Z (for 2 conductor layers) or 4*Z (for 4 conductor layers). Coils of the same half-phase are interconnected and become a half-phase winding. A half-phase winding consists of PP*Zpph coils, where PP is the number of pole pairs, and Zpph is the number of coils per half-phase per pole. Since there are six half-phase windings in the motor, the total number of coils in the motor may be expressed as Z=6*PP*Zpph.

Figure 4:
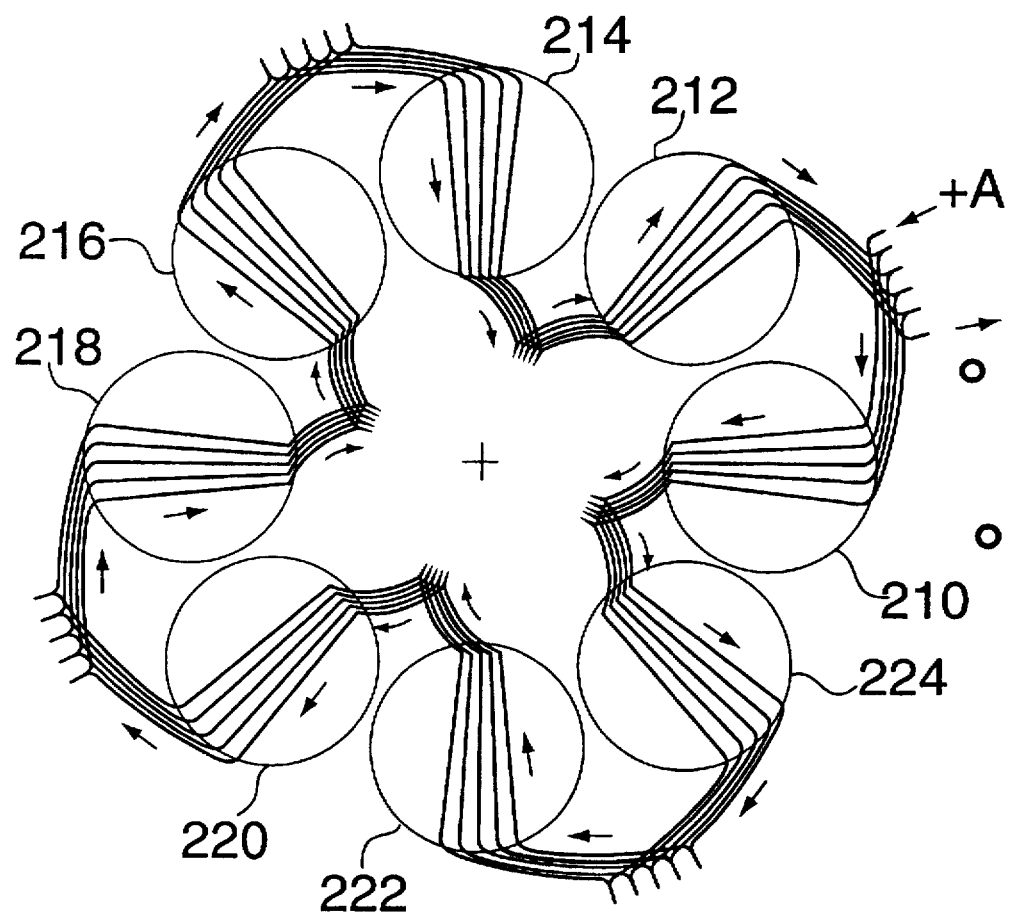
FIG. 4 shows an +A half-phase winding in accordance with a first embodiment of the present invention.

In the description that follows, two preferred embodiments will be discussed in greater detail. The first embodiment (depicted in FIGS. 4–10) may be constructed using either the printing or stamping technique, but not the notching technique. The second embodiment (depicted in FIGS. 11–18) may be constructed using any of the three techniques discussed—printing, stamping, or notching. To facilitate construction via the notching technique, in the second embodiment, the spacing between segments on a layer must be identical so that the conductor pattern can be made with a single notching tool. Spacings for connections to the connecting layer are achieved by removing selected winding segments. For the first embodiment where the spacings and segment configuration need not be identical throughout the winding, spacings S (FIG. 9) for connections to the connecting layer are achieved by having more tap spaces at the outer diameter than exist at the inner diameter. FIG. 4 illustrates a +A half-phase winding 402 for the winding according to the first embodiment. The permanent magnet poles 210–224 are shown superimposed on the winding. The +A half-phase winding includes groups of radial conductors covering approximately ⅓ of each of the magnet pole faces, each such group including five radial conductors. The half-phase winding starts at an outer tap +A in and progresses inwardly across magnet 210 to an inner tap in layer 1. This inner tap is joined to an inner tap in layer 2 and the winding progresses outwardly across magnet 224 to an outer tap to complete a coil of the winding. This outer tap is joined to an outer tap in layer 1 to start the second coil. The half-phase winding progresses in this fashion forming successive coils with each including an inwardly directed radial conductor in layer 1 and an outwardly directed radial conductor in layer 2. After progressing through five radial conductors across each pole face the half-phase winding ends at an outer tap +A out, identified by the outwardly directed arrow in FIG. 4.

Figure 5:
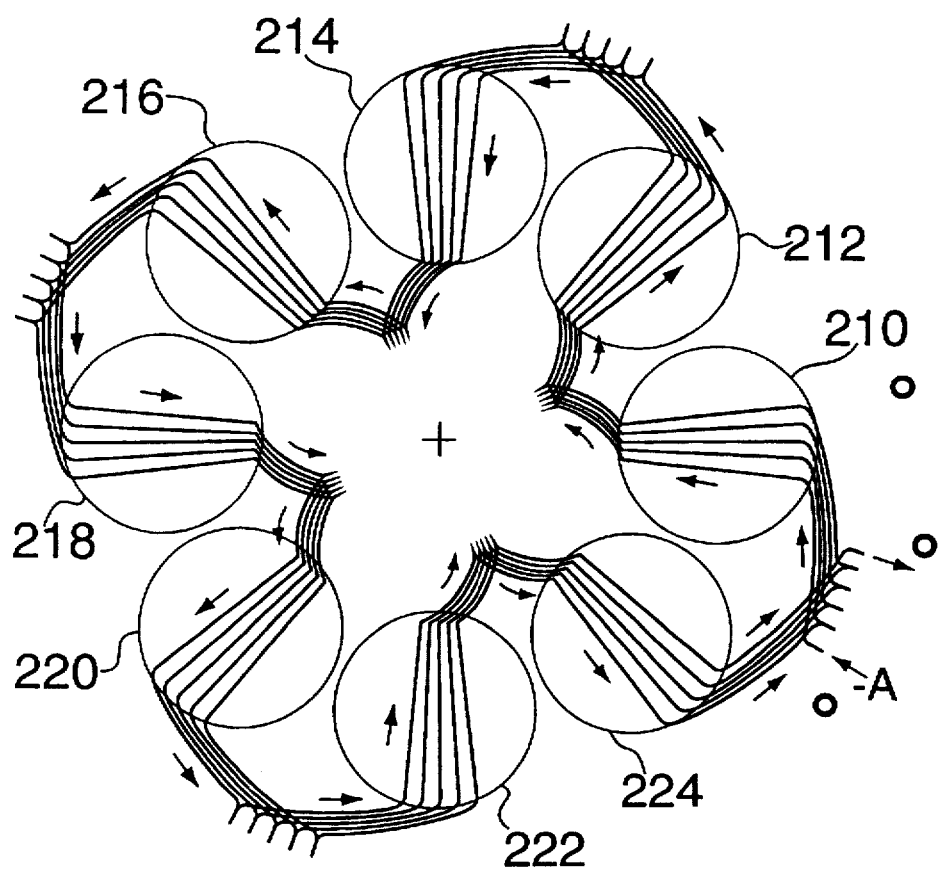
FIG. 5 shows an −A half-phase winding in accordance with a first embodiment of the present invention.

The –A half-phase winding is illustrated in FIG. 5 starting at outer tap –A in. This half-phase winding proceeds inwardly across magnet 210 and outwardly across magnet 212, etc. The –A half-phase winding progresses in a counter-clockwise direction whereas the +A phase-winding progresses in a clockwise direction. For each group of +A half-phase conductors crossing a particular magnetic pole face in layer 1, there is a corresponding group of –A half-phase conductors crossing the same pole face in layer 2.

Figure 6:
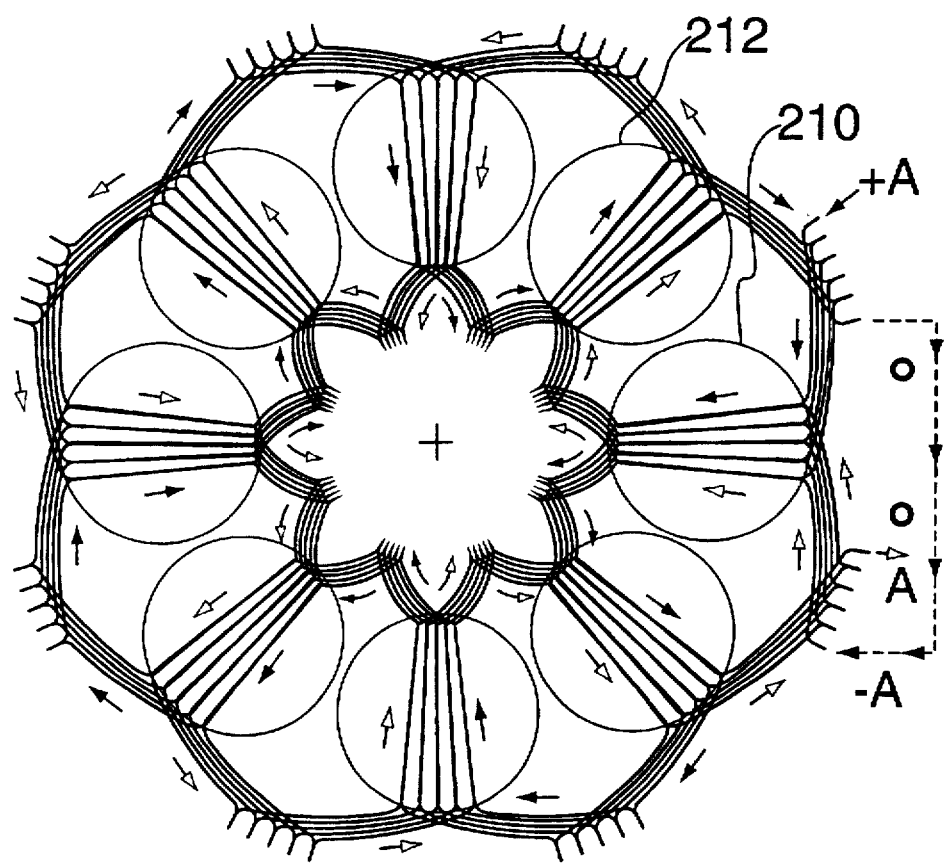
FIG. 6 shows a complete phase A winding (+A half phase and −A half-phase) in accordance with a first embodiment of the present invention.

As illustrated in FIG. 6, when the +A half-phase and the –A half-phase windings are interconnected, as shown by the dotted line connections, current flows in the same direction across a pole face in layer 1 and layer 2. The combination of the +A and –A half-phase windings is called the phase A winding.

Figure 7:
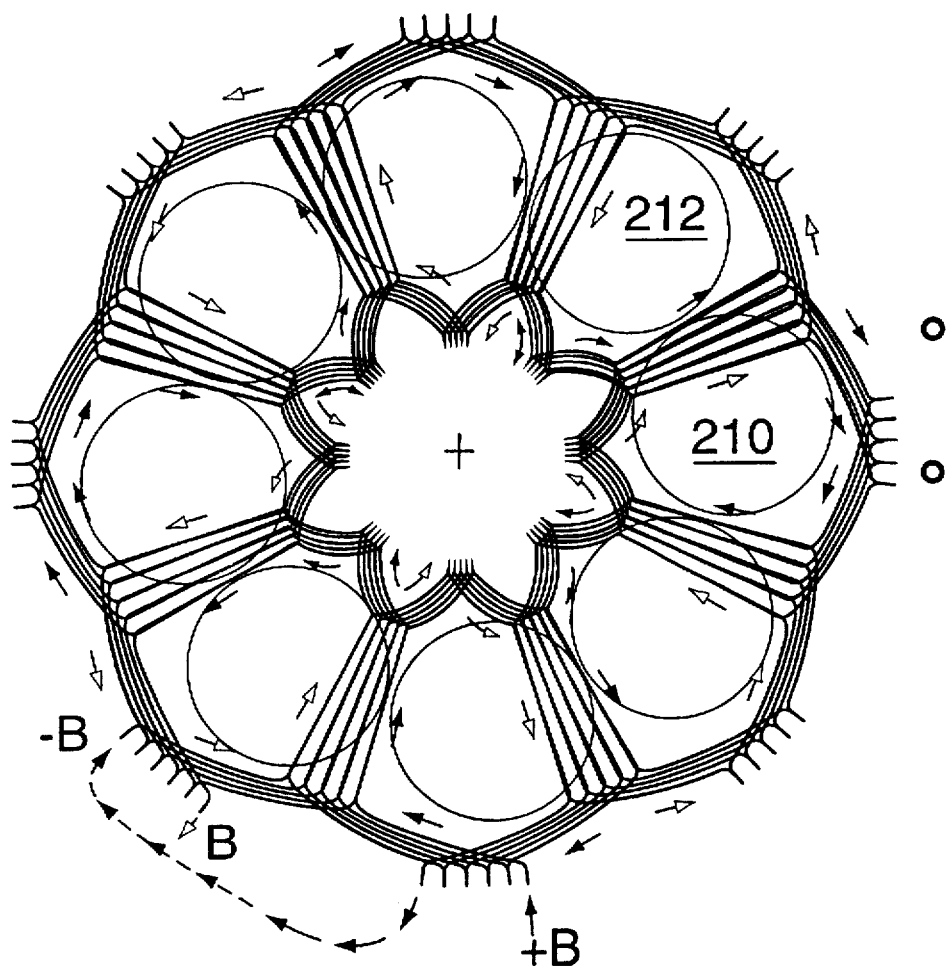
FIG. 7 shows a complete phase B winding in accordance with a first embodiment of the present invention.
Figure 8:
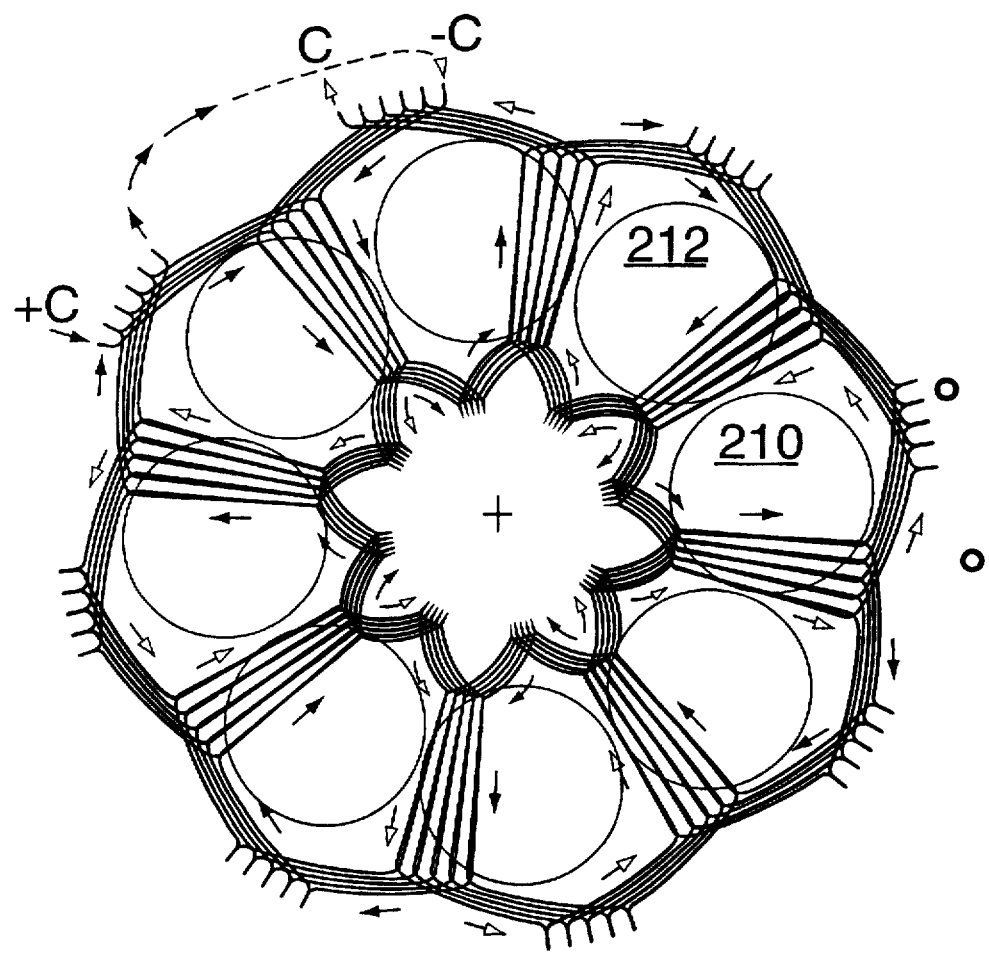
FIG. 8 shows a complete phase C winding in accordance with a first embodiment of the present invention.

Winding patterns similar to that of FIG. 6 are formed for the +B, –B, +C and –C half-phases, as shown in FIGS. 7 and 8, FIG. 7 showing the resulting phase B winding, and FIG. 8 showing the resulting phase C winding. However, the positions of the B and C phase windings are shifted by a ⅓ pole spacing compared to the phase A winding, as well as being shifted compared to each other.

Figure 9:
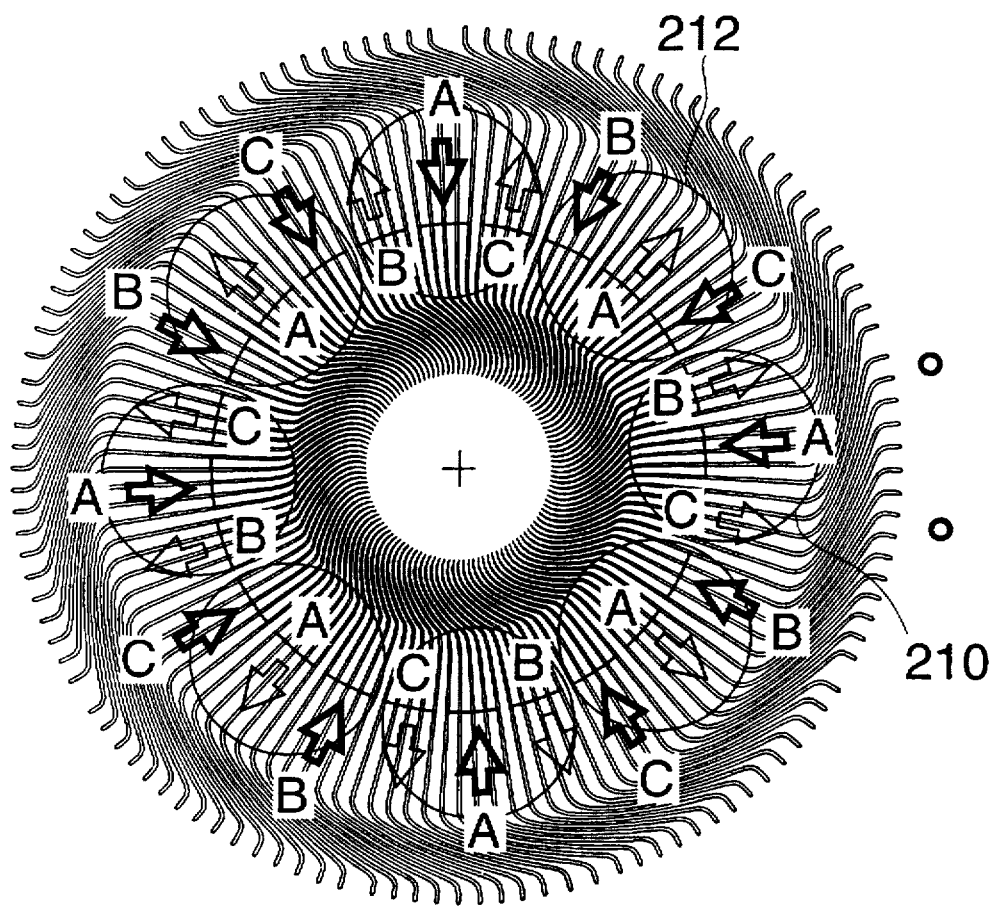
FIG. 9 shows the layer 1 winding pattern that results when the phase windings of FIGS. 6, 7 and 8 are combined.
Figure 10:
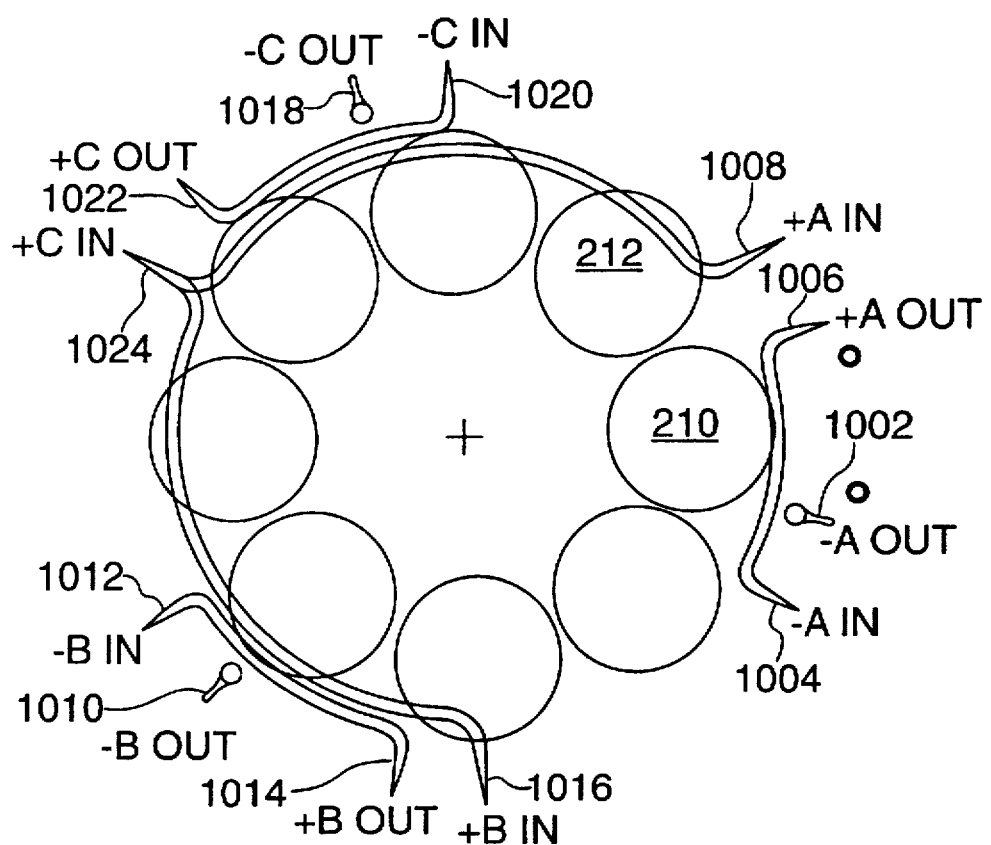
FIG. 10 depicts a connecting layer suitable for use with the combined phase A, B and C phase windings.

FIG. 9 shows the layer 1 pattern that results when the windings of FIGS. 6, 7 and 8 are combined. A similar pattern is formed in layer 2, and together the two-layers form the six half-phase windings. The half-phase windings are connected by means of a connecting layer as shown in FIG. 10. The connecting layer has 12 taps 1002–1024. The –A half-phase winding is coupled between taps 1002 and 1004. The +A half-phase winding is coupled between taps 1006 and 1008, with tap 1008 being part of the common center of a three phase wye configuration. Thus, the phase A branch of the wye consists of the –A half-phase winding and +A half-phase windings connected in series, with tap 1008 being the common connection. The phase B and phase C windings are similarly connected. The –B half-phase winding is located between taps 1010 and 1012, and the +B half-phase winding between taps 1014 and 1016. The –C half-phase winding is located between taps 1018 and 1020, and the +C half-phase between taps 1022 and 1024.

The two above-described conductor layers and the connecting layer of FIG. 10 form a two-layer stator for the motor of the present invention. A four layer stator winding can be built by adding two more conductor layers in parallel to the above-described conductor layers. Since the coils are connected in parallel, the connecting layer of FIG. 10 may still be used to provide the necessary wye connections.

As mentioned above, the second embodiment of the invention facilitates construction using the notching technique. For this illustration the stator winding is made up of 5 layers, each initially having 129 equally spaced conductor segments.

Figure 11:
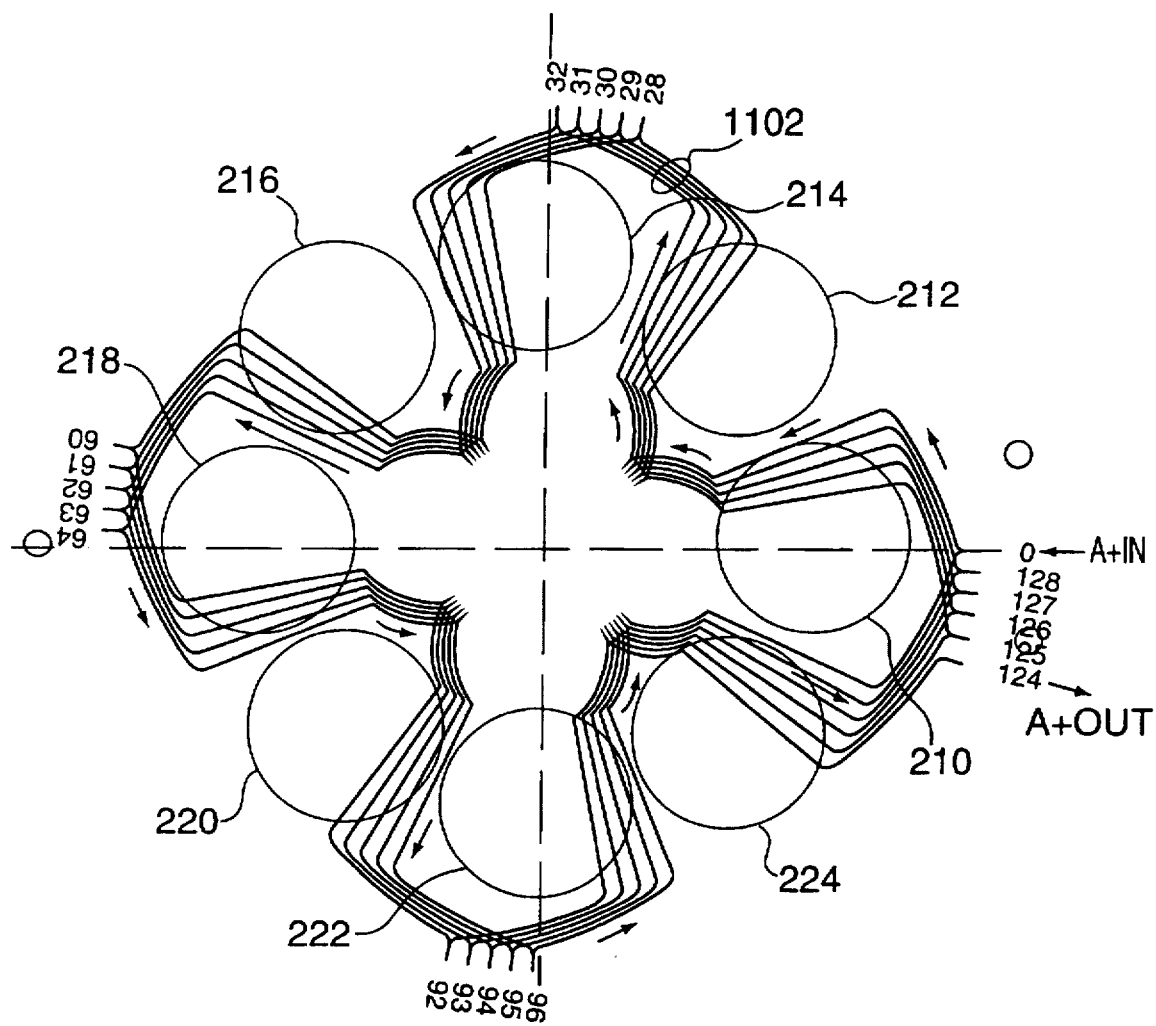
FIG. 11 shows an A+ half-phase winding in accordance with a second embodiment of the present invention.

FIG. 11 illustrates an A+ half-phase winding 1102. The half-phase winding includes groups of radial conductors covering approximately ⅓ of each of the magnet pole faces. The phase winding starts at an outer tap, A+ in (layer 2 tap position 0), and progresses inwardly across magnet 210 to an inner tap in layer 2. This inner tap is joined to an inner tap in layer 1 and the winding progresses outwardly across magnet 212 to an outer tap to complete the first coil. This outer tap in layer 1 is then joined to an outer tap in layer 2 to start the second coil. The half-phase winding progresses in this fashion forming successive coils with each such coil including an inwardly directed radial conductor in layer 2 and an outwardly directed radial conductor in layer 1. After progressing through five radial conductors across each pole face, the half-phase winding progresses outwardly across the radial conductor denoted by layer 2 tap position 124 and ends at an outer tap identified as A+ out.

Figure 12:
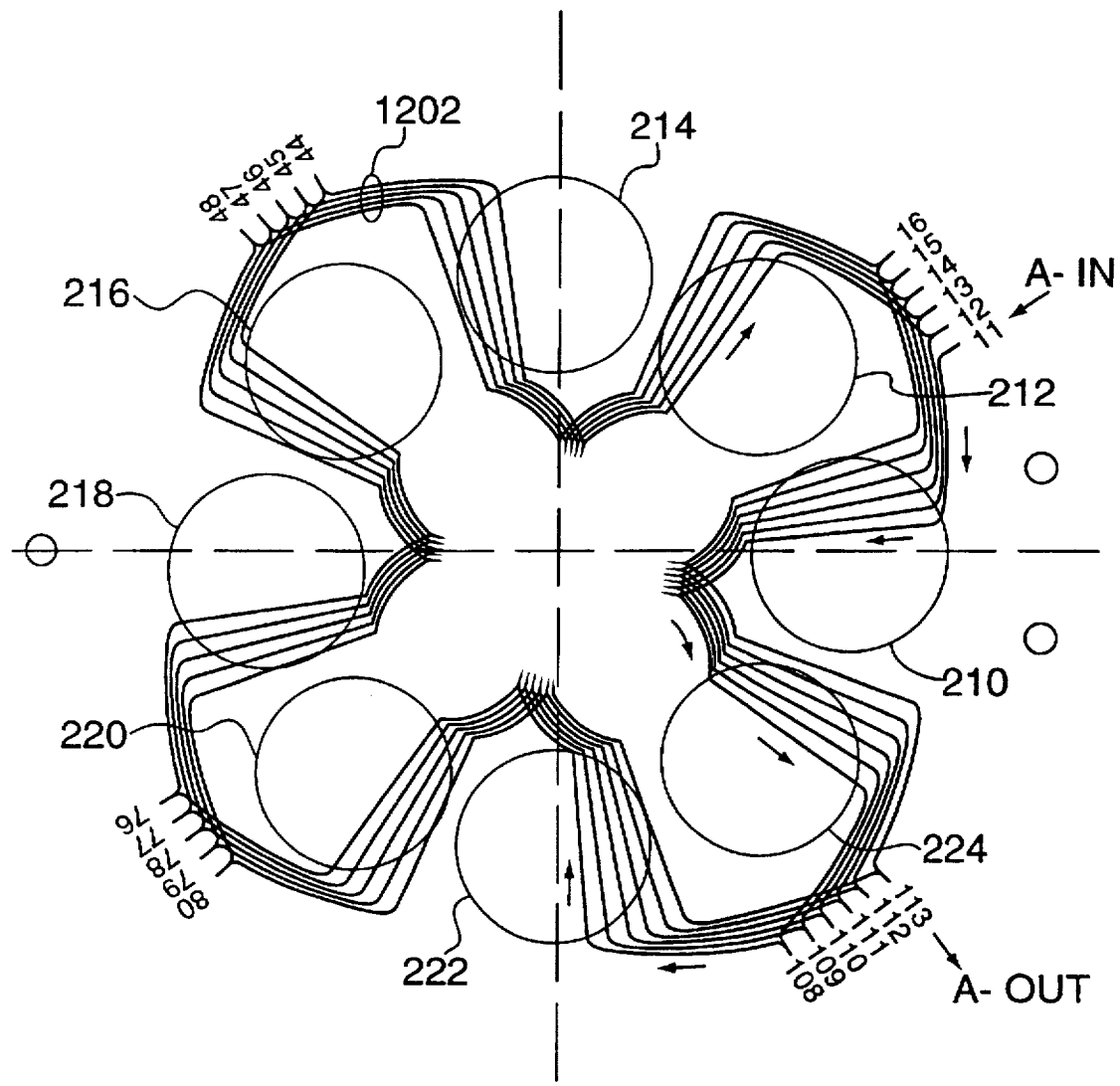
FIG. 12 shows an A− half-phase winding in accordance with a second embodiment of the present invention.
Figure 13:
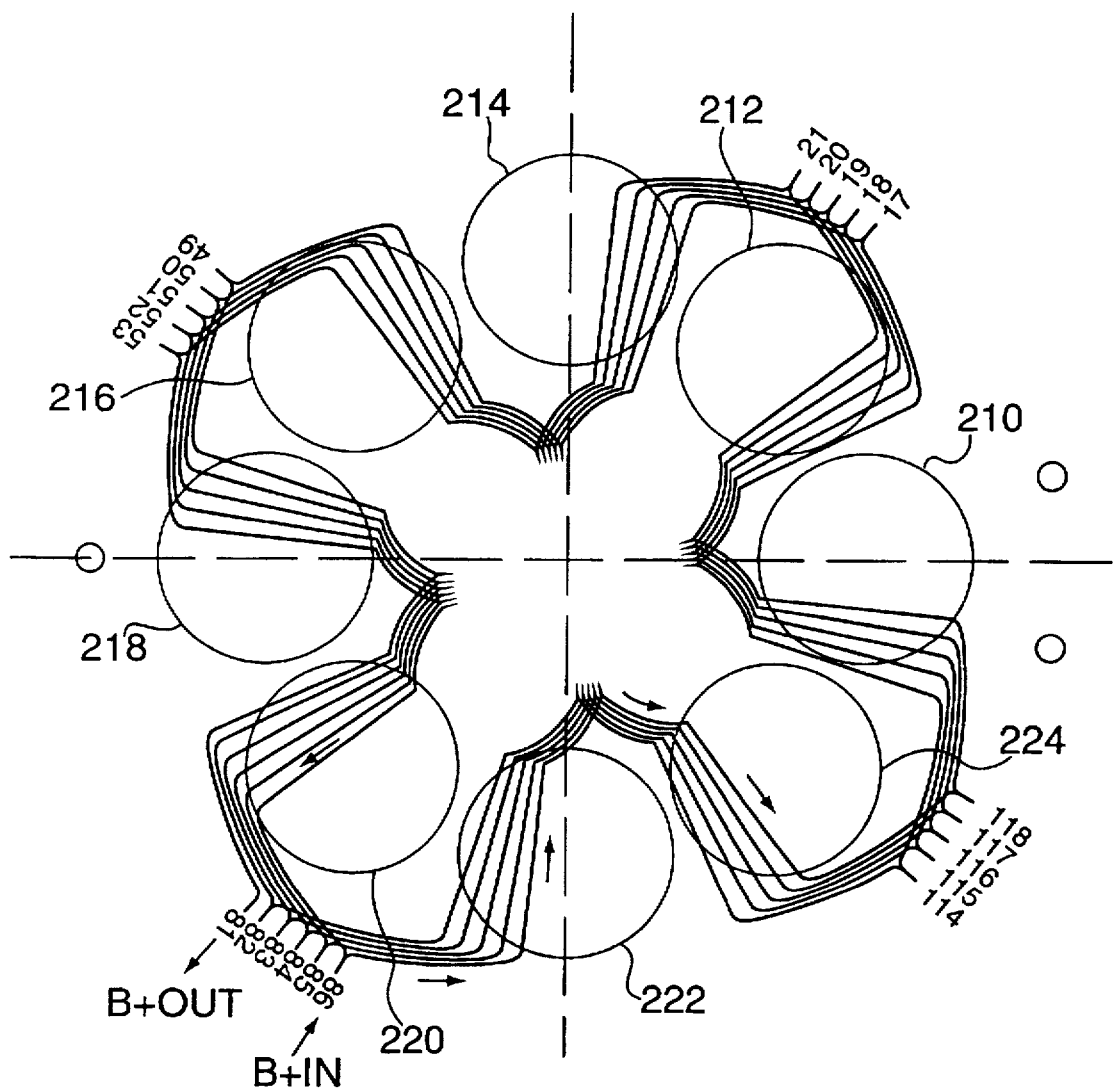
FIG. 13 shows a B+ half-phase winding in accordance with a second embodiment of the present invention.
Figure 14:
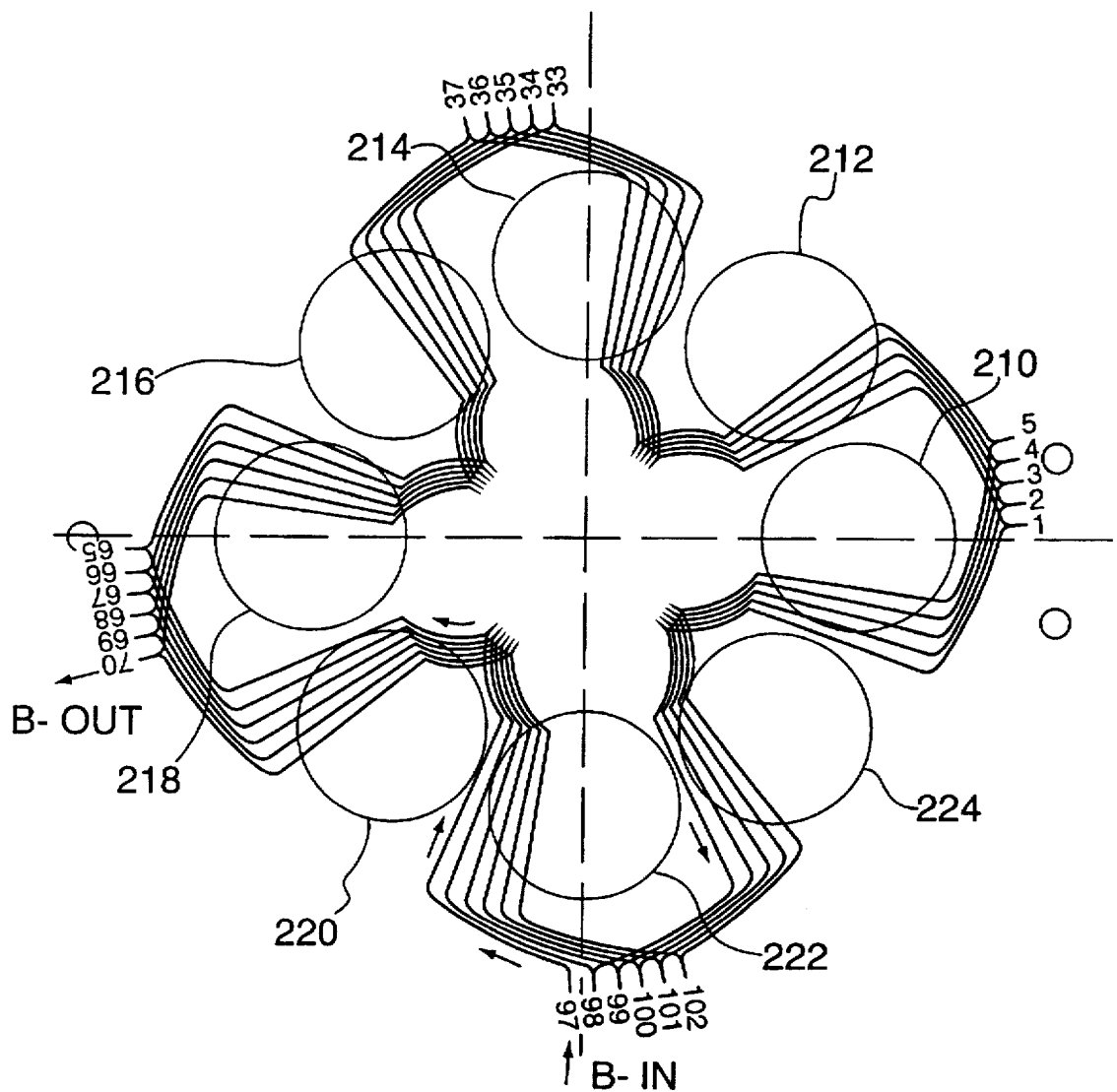
FIG. 14 shows a B− half-phase winding in accordance with a second embodiment of the present invention.
Figure 15:
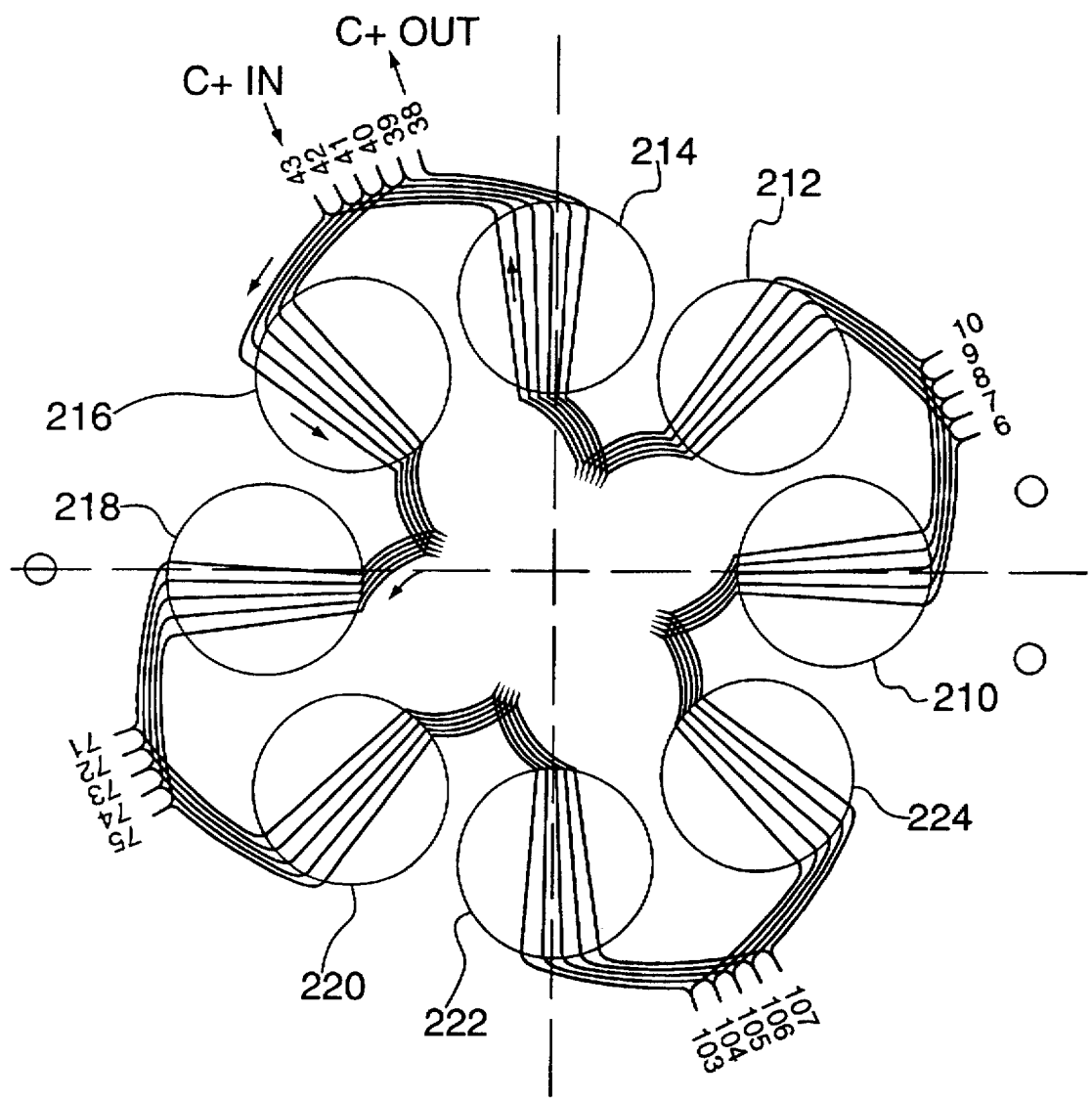
FIG. 15 shows a C+ half-phase winding in accordance with a second embodiment of the present invention.
Figure 16:
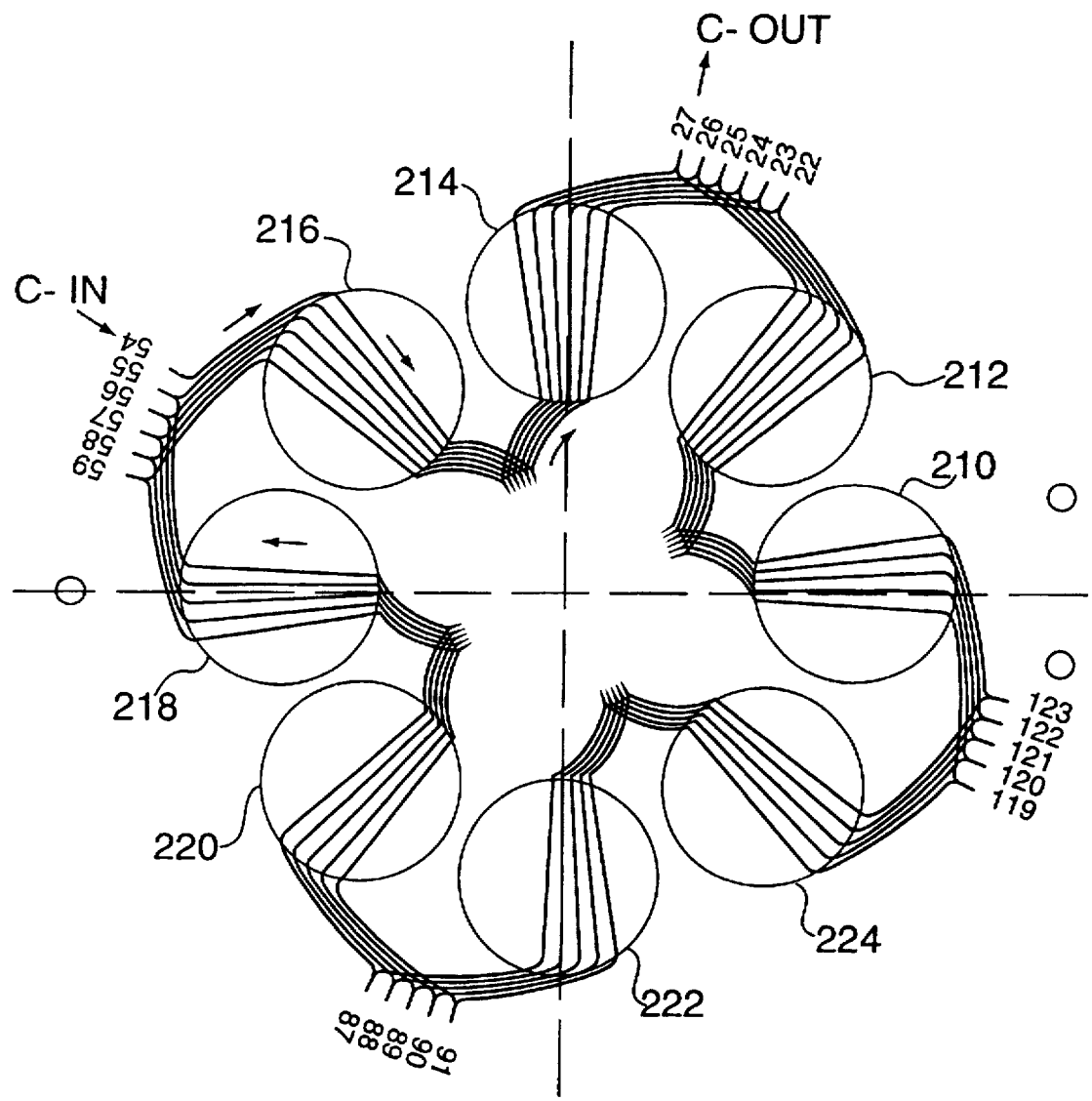
FIG. 16 shows a C− half-phase winding in accordance with a second embodiment of the present invention.

The A- half-phase winding is illustrated in FIG. 12 starting at outer tap A- in (layer 1 tap position 11). This half-phase winding proceeds inwardly across magnet 210 and outwardly across magnet 224, etc. The A- half-phase winding progresses in a counterclockwise direction whereas the A+ half-phase winding progresses in a clockwise direction. For each group of A+ half-phase conductors crossing a particular magnetic pole face in layer 2, there is a corresponding group of A- half-phase conductors crossing the same pole face in layer 1. Winding patterns similar to those of FIGS. 11 and 12 are formed for the B+, B-, C+ and C- half-phase windings, as shown in FIGS. 13, 14, 15 and 16, respectively.

Figure 17:
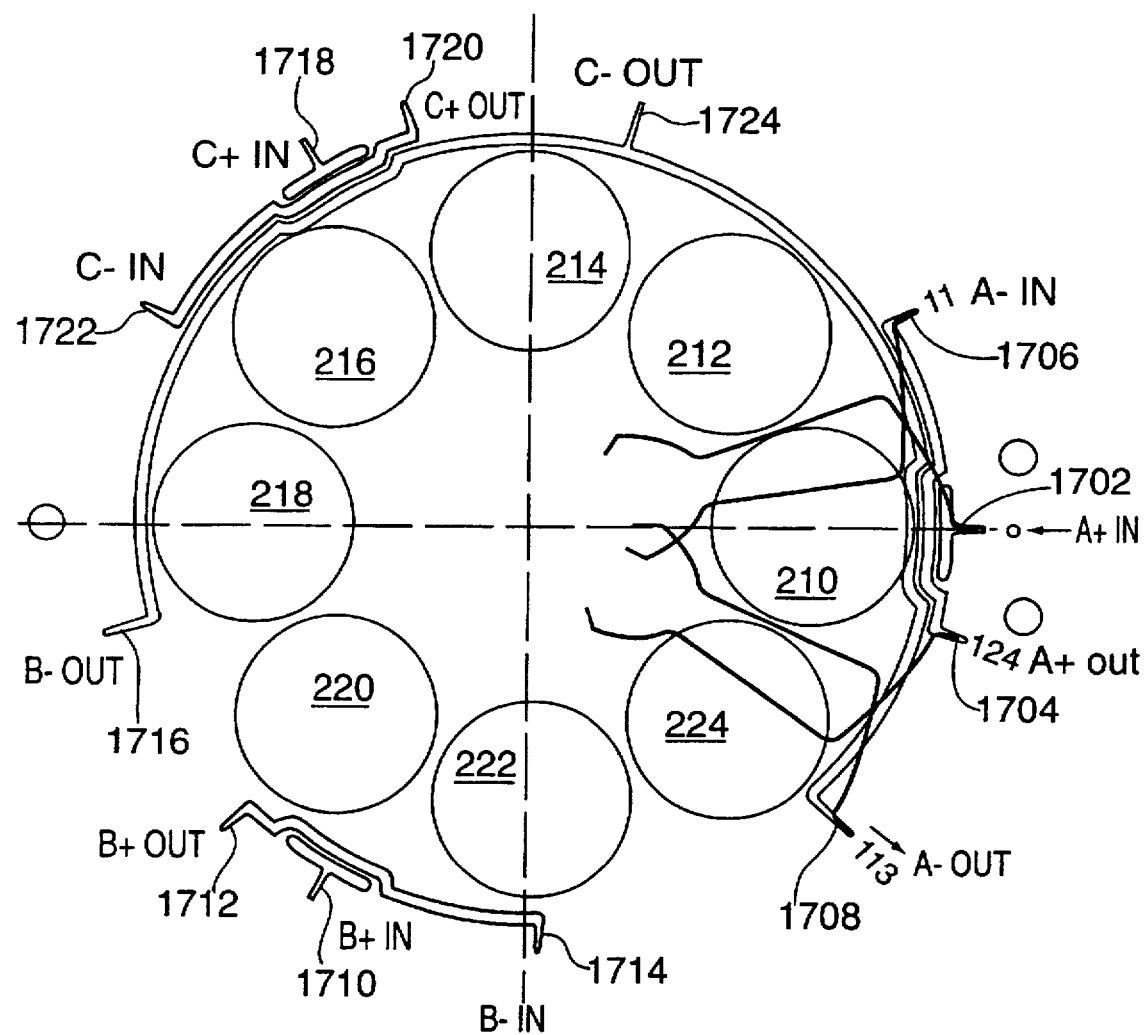
FIG. 17 depicts a connecting layer suitable for interconnecting the half-phase windings of FIGS. 11–16.
Figure 17A:
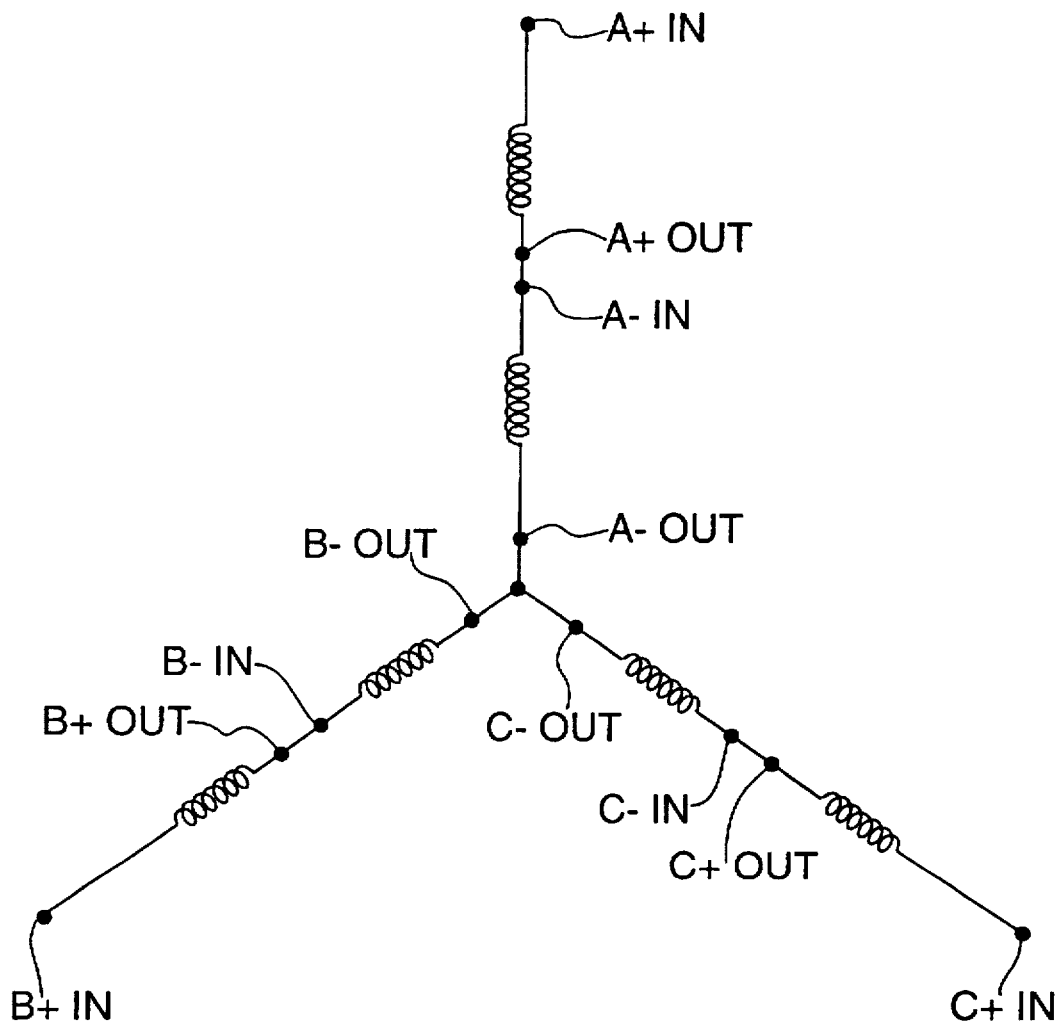
FIG. 17A is a circuit diagram that illustrates how six half-phase windings according to the present invention may be interconnected by the connecting layer of FIG. 17.

The A+, A-, B+, B-, C+ and C- half-phase winding patterns of FIGS. 11-16 are interconnected by a connecting layer in a three phase wye configuration, as shown in FIG. 17. The connecting layer has 12 taps 1702-1724. The A+ half-phase winding is coupled between taps 1702 and 1704. The A- half-phase winding is coupled between taps 1706 and 1708 (the common wye tap). Thus, as shown in FIG. 17A, the A+ and A- half-phase windings are connected in series to form the phase A winding. The phase B and phase C windings are similarly formed. The B+ half-phase winding is located between taps 1710 and 1712, and the B- half-phase winding between taps 1714 and 1716. The C+ half-phase winding is located between taps 1718 and 1720, and the C- half-phase winding between taps 1722 and 1724.

Figure 18:
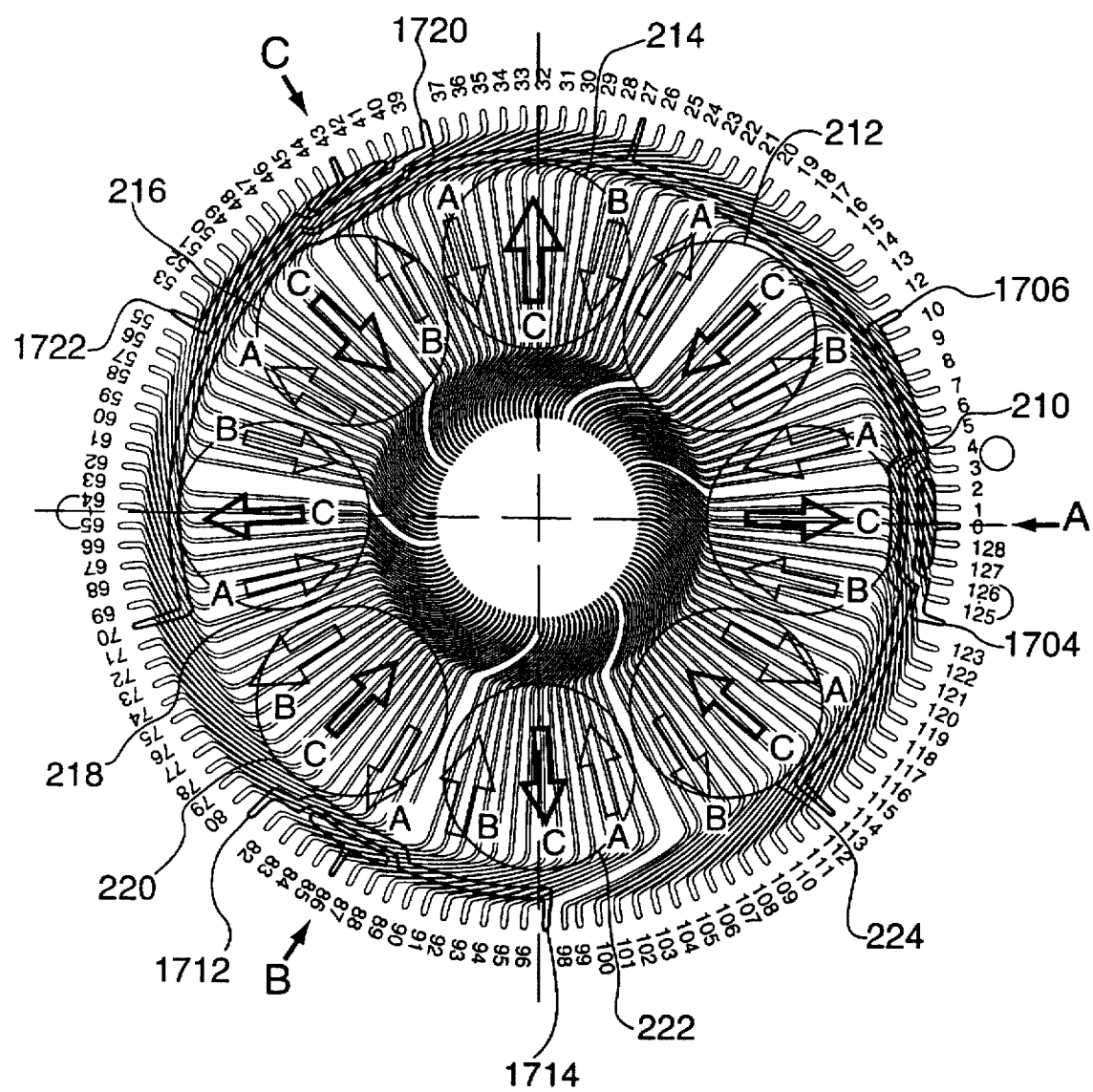
FIG. 18 shows the winding pattern that results when the half-phase windings of FIGS. 11–16 and the connecting layer of FIG. 17 are combined.

FIG. 18 illustrates the top conducting layer pattern (layer 1) that results when the windings of FIGS. 11-16 are combined. The pattern is superimposed on the connecting layer of FIG. 17. The conducting layer pattern of FIG. 18 includes 123 outer taps and six unused tap positions. The unused tap positions in the top layer are used to connect the taps in the bottom conductor layer (layer 2) to the connecting layer taps (clockwise from 0) 1704, 1714, 1712, 1722, 1720 and 1706. The top conducting layer shown in FIG. 18 can be constructed by notching out 129 equally spaced conductor segments in a copper sheet and by then selectively removing six segments at tap positions 11, 38, 54, 81, 97 and 124 to provide space in which to connect the bottom conductor layer to the connecting layer. Similarly, conductor segments at tap positions 11, 38, 54, 81, 97 and 124 are removed from the bottom conductor layer (layer 2) to provide spaces to connect taps of the bottom conductor layer to the connecting layer.

The two above-described conductor layers and the connecting layer of FIG. 17 form a two-layer stator for the motor of the present invention. A four layer stator winding can be built by adding two more conductor layers in parallel to the above-described conductor layers. Since the coils are connected in parallel, the connecting layer of FIG. 17 may still be used to provide the necessary wye connections.

A motor built in accordance with the principles of the present invention can be designed to substantially eliminate torque ripple. Before describing how the motor eliminates ripple, a mathematical analysis of torque ripple will be provided.

The formula for torque as a function of time may be written:

$$T_q(t) = P(t)/\omega(t)$$

To simplify normalize with respect to $\omega(t)$. Letting $\omega(t)=1$, $$T_q(t) = P(t)$$

Thus, for purposes of this analysis, power as a function of time is the same as torque as a function of time.

For a three phase motor the electromagnetic power formula may be written:

$$P(t) = e_a(t) \cdot i_a(t) + e_b(t) \cdot i_b(t) + e_c(t) \cdot i_c(t)$$

where $e_a(t)$ is the back emf of phase A
$i_a(t)$ is the current of phase A
$e_b(t)$ is the back emf of phase B
$i_b(t)$ is the current of phase B
$e_c(t)$ is the back emf of phase C
$i_c(t)$ is the current of phase C If the motor drive provides the following currents:

$$i_a(t) = \text{Sin}(\omega t)$$

$$i_b(t) = \text{Sin}(\omega t - 120°)$$

$$i_c(t) = \text{Sin}(\omega t - 240°)$$

and the motor is designed to have the following three phase back emf:

$$e_a(t) = \text{Sin}(\omega t)$$

$$e_b(t) = \text{Sin}(\omega t - 120°)$$

$$e_c(t) = \text{Sin}(\omega t - 240°)$$

Then we can write the equation for torque (power) as:

$$\begin{aligned} T_g(t) = P(t) &= \text{Sin}(\omega t) \cdot \text{Sin}(\omega t) + \text{Sin}(\omega t - 120°) \cdot \\ &\quad \text{Sin}(\omega t - 120°) + \text{Sin}(\omega - 120°) \cdot Si \\ &= \text{Sin}^2(\omega t) + \text{Sin}^2(\omega t - 120°) + \text{Sin}^2(\omega t - 240°) \end{aligned}$$

At this point we can apply the trigonometric identity:

$$\text{Sin}^2(\alpha) + \text{Sin}^2(\alpha - 120°) + \text{Sin}^2(\alpha - 240°) = 3/2$$

to yield:

$$T_q(t) = P(t) = 3/2$$

Thus, for sinusoidal excitation currents and back emfs, the torque will be constant for any value of t. That is, the torque is ripple free. It will be assumed that sinusoidal, or near sinusoidal, excitation currents can be provided by the motor drive. In which case, the amount of torque ripple will be directly proportional to the amount that the back emfs deviate from pure sinusoids. Therefore, to analyze the torque ripple it is sufficient to analyze how closely the back emfs approximate a sine wave.

For a three phase motor having identical phase windings, A, B and C, an analysis of the back emf for one of the windings is sufficient to describe all three of the windings. In addition, it is noted that a winding is a series connection of several coils. It then follows that the torque ripple for a three phase motor according to the invention may be described by the following equation:

$$e_a(t) = e_{coil1}(t) + e_{coil2}(t) + \ldots = \Sigma e_{coilk}(t)$$

Since it is the conductor (segment) portion of each conductor that contributes to the back emf, the above equation may be re-written as:

$$e_{coilk}(t) = e_{segk1}(t) + e_{segk2}(t) + \ldots = \Sigma e_{segkj}(t)$$

Then $$e_a(t) = \Sigma e_{coilk}(t) = \Sigma\Sigma e_{segkj}(t) = \Sigma e_{segk}(t)$$

Where k means all of the segments in winding A. Thus, the winding back emf is a linear combination of its conductor back emfs.

For a conductor moving through a magnetic field the magnitude of the generated voltage, E, is given by:

E=BLV where B is the magnetic flux density, L is the length of the conductor, and V is the velocity of the conductor. In the case at hand, for a given segment, E (the back emf) is a function of time, and L (the effective length of the conductor - that portion falling underneath a magnetic pole) is a function of time and initial rotor position. Therefore, the above equation becomes:

$$e_{segk}(t) = BL(\theta_{ko}, t)V(t)$$

where $\theta_{ko}$ is the segment's initial position relative to the rotor. Considering the speed to be constant and normalizing with respect to speed:

$$e_{segk}(t) = BL(\theta_{ko}, t)$$

Another way of expressing this relationship is:

$$e_{segk}(t) = BL(\theta_k)$$

where $\theta_k$ is the relative position of the segment and rotor. When the rotor is turning at a constant angular velocity $\omega$, $\theta_k = \theta_{ko} + \omega t$, and the back emf for a segment may be expressed as:

$$e_{segk}(t) = BL(\theta_{ko} + \omega t)$$

Thus, to obtain a plot of the back emf waveform of a segment, BL may be plotted as a function of rotor position (BL vs. $\theta_k$). Moreover, a linear combination of pure sine waves of a given frequency is a sine wave of that frequency, and therefore if the back emf waveform of a segment is purely sinusoidal then the phase winding back emf waveform will be purely sinusoidal. As mentioned above, the more closely the back emf can be made to approximate a sine wave, the better the torque ripple characteristics of the motor.

Figure 19:
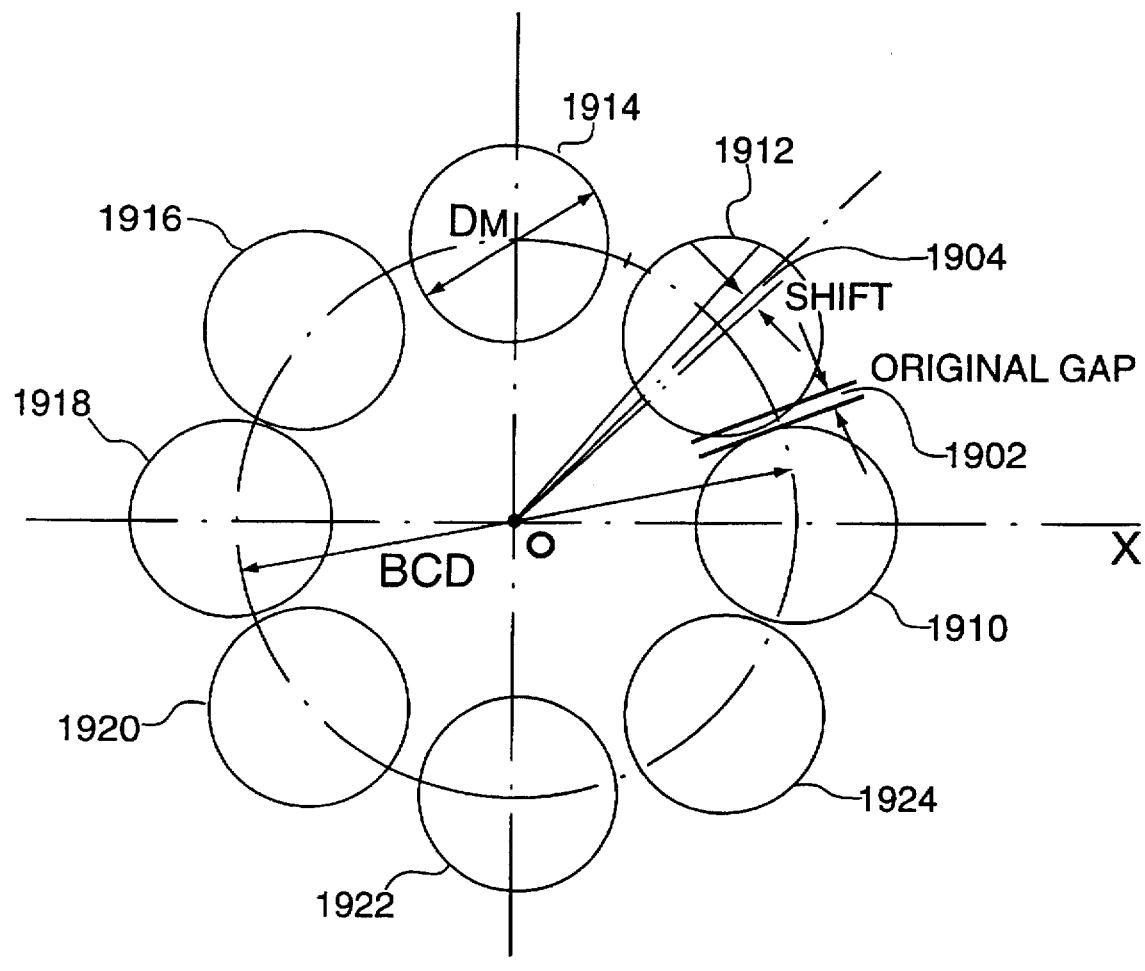
FIG. 19 is a conceptual profile view of a rotor according to the present invention.

A computer simulation of a motor according to the present invention was used to create plots of the BL vs. $\theta$k characteristic of the motor. The rotor model was a 4 pole pair, 8 pole (1902-1924) rotor, as shown in FIG. 19. Each pole has a diameter Dm, and the center of the poles lying on the rotor bolt circle with a diameter BCD. Each pole pair is associated with 360° (electrical) of the back emf waveform. Accordingly, the 4 pole pairs shown in the figure represent 1440° (electrical) of the back emf waveform. In the plots of BL vs. $\theta_k$ that follow, $\theta_k$ is varied from 0° to 720°; or, in other words, BL is plotted for ½ of a full rotor rotation. Since the positioning of the poles will always be symmetric about the x-axis, the 720° plots will be sufficient to fully describe the back emf waveforms.

Two variables which define the placement of the poles along the bolt circle are shown in the FIG. 19, a gap 1902 and a shift 1904. These variables are nominally defined in the simulation by the following two factors:

(1) The Gap Factor, Cs, describes the original gap between the poles before any pole centers are shifted. The value of Cs is given by: Cs=Gap/(Gap+Dm). The following equation relates Cs to the pole diameter and bolt circle diameter:

$$Dm = BCD \times \sin[(1-Cs)22.5°].$$

(2) The Magnet Uneven Factor, Cp, describes the shift illustrated in FIG. 19. As can be seen from the figure, the centers of poles 1912 and 1924 are moved closer to the center of pole 1910, while the centers of poles 1916 and 1920 are moved closer to the center of pole 1918. The following equation relates Cp to the center shift angle:

Center shift angle=$Cp \times 22.5°$.

In addition to the two above-named factors, there is a third factor which is accounted for in the computer simulation. The third factor is called the Conductor Short Factor, or "Css". The length of the straight portion of a segment, Ls, is related to Css according to the following equation: Ls=(1−Css)22.5°. Ls is the effective length of the radial conductor section shown, for example, in FIGS. 3A–3C. The motor simulation was run for various values of the three factors, Cs, Cp and Css. The results of the simulation runs and the conclusions drawn from them are described below.

Figure 20A:
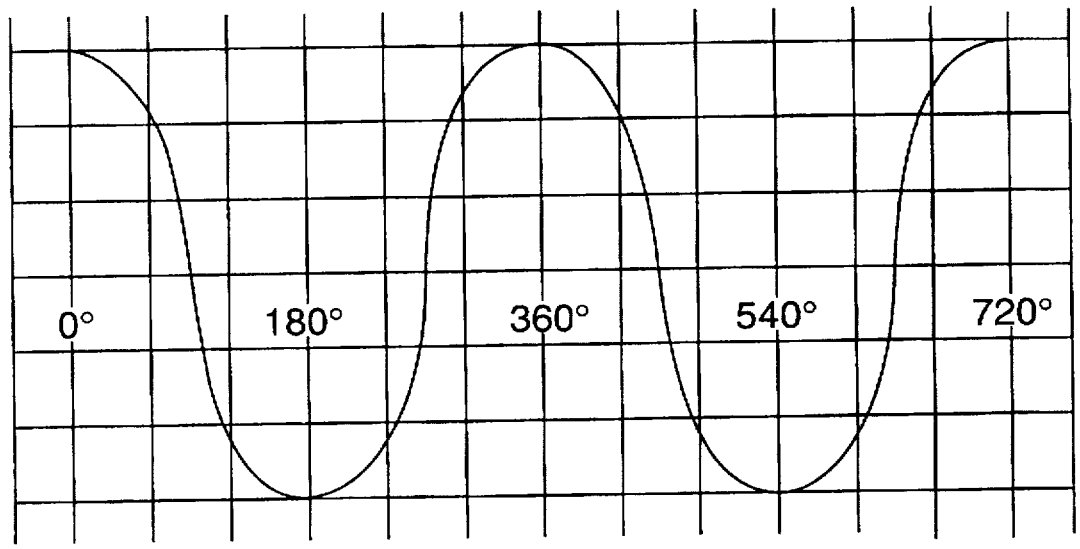
FIG. 20A is a plot representative of the back emf generated by a motor incorporating a first rotor embodiment according to the present invention.
Figure 20B:
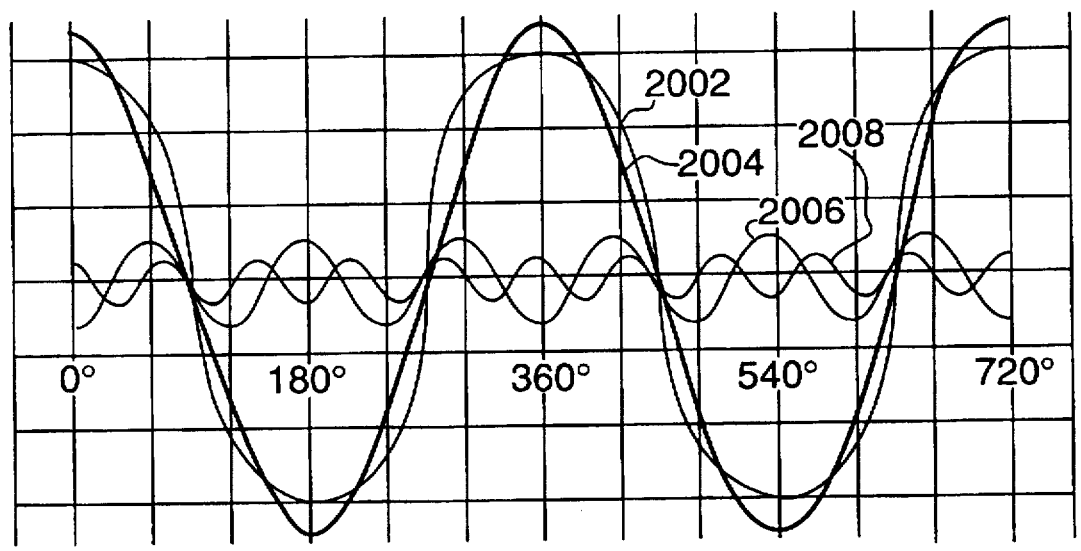
FIG. 20B is a plot of the curve of FIG. 20A with the 1st, 3rd and 5th harmonics of the curve superimposed.
Figure 21A:
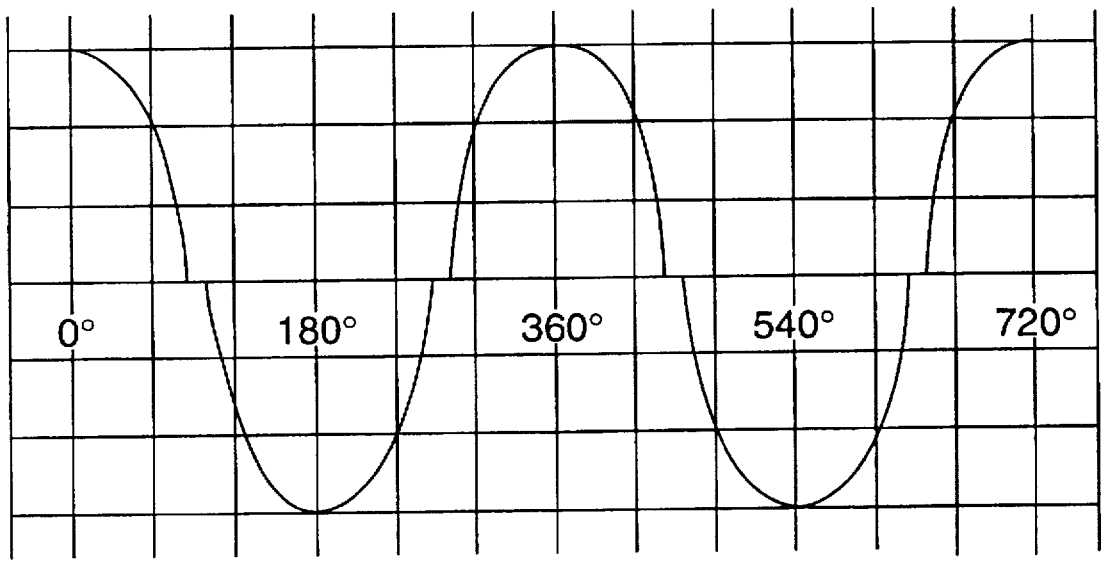
FIG. 21A is a plot representative of the back emf generated by a motor incorporating a second rotor embodiment according to the present invention.
Figure 21B:
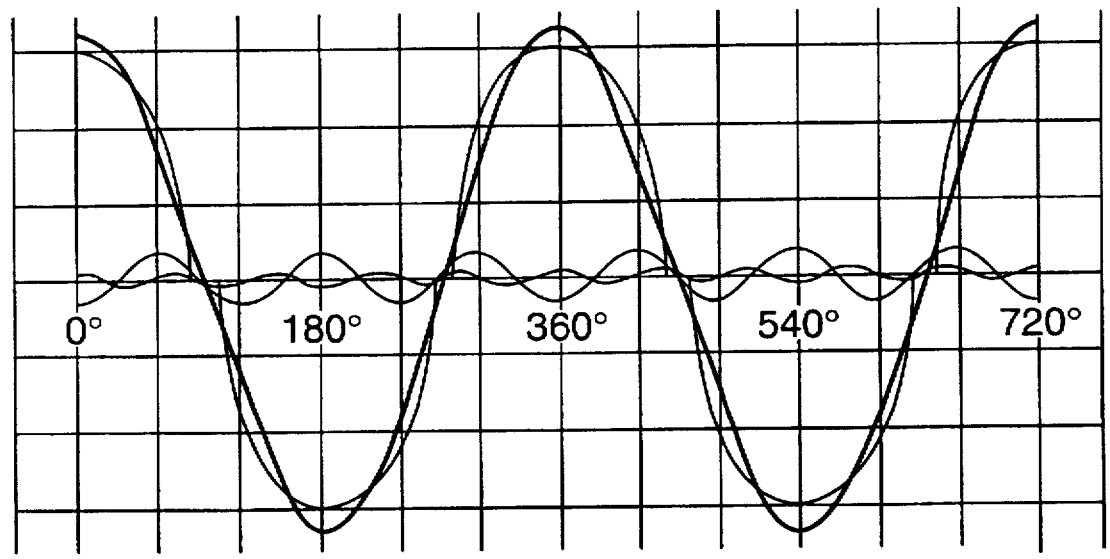
FIG. 21B is a plot of the curve of FIG. 21A with the 1st, 3rd and 5th harmonics of the curve superimposed.
Figure 22A:
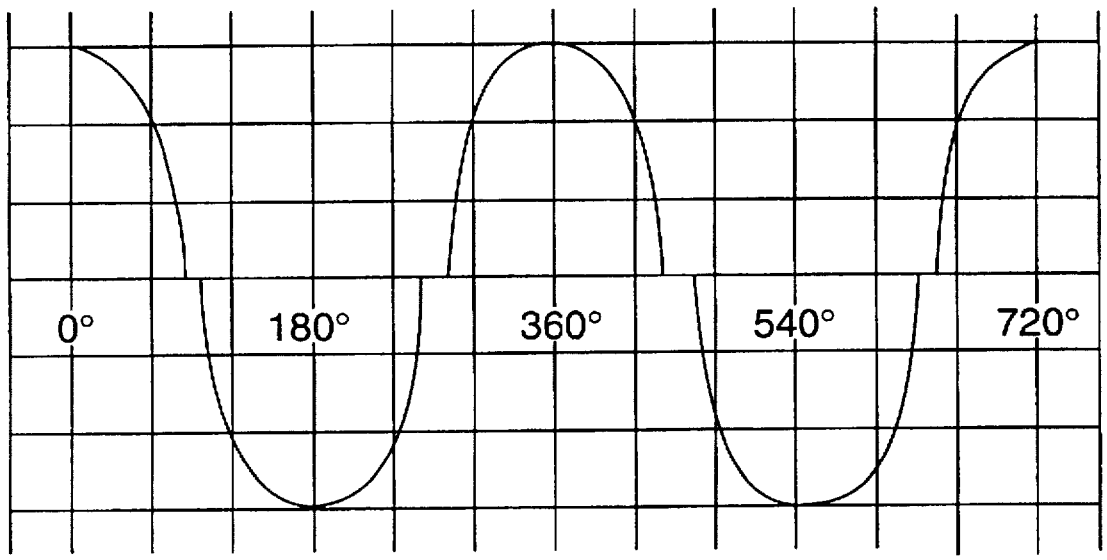
FIG. 22A is a plot representative of the back emf generated by a motor incorporating a third rotor embodiment according to the present invention.
Figure 22B:
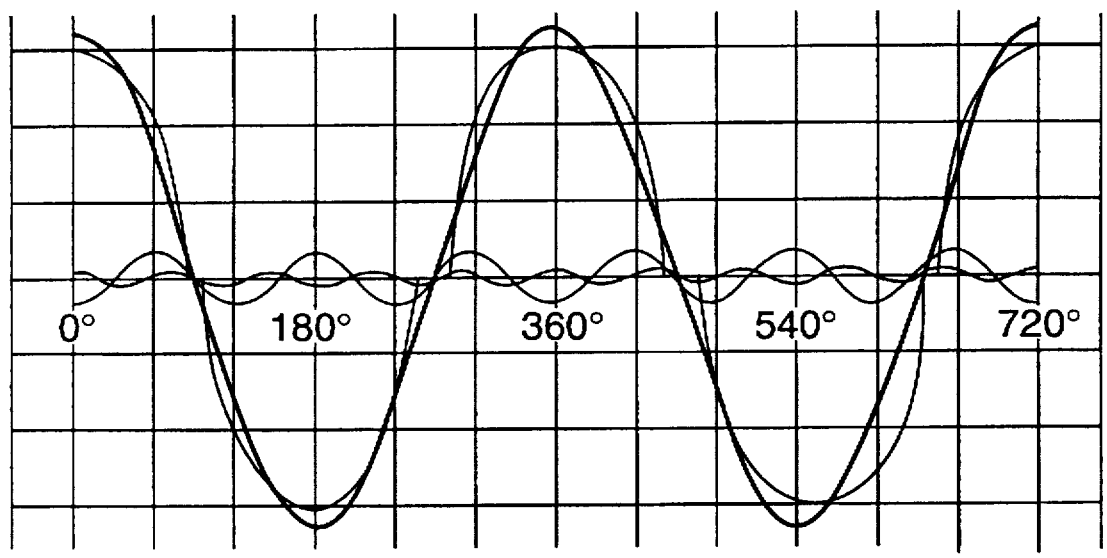
FIG. 22B is a plot of the curve of FIG. 22A with the 1st, 3rd and 5th harmonics of is the curve superimposed.

FIG. 20A shows the BL vs. $\theta_k$ plot for a single segment for the case of Cs=0%, Cp=0% and Css=0%. In FIG. 20B the curve of FIG. 20A is reproduced (curve 2002), and the harmonics that make up curve 2002 are superimposed thereon. The fundamental is shown as curve 2004, the third harmonic as curve 2006, and the fifth harmonic as curve 2008. FIGS. 21A and 21B show similar plots for the case of Cs=6%, Cp=0% and Css=0%. FIGS. 22A and 22B show plots for the case of Cs=8%, Cp=4% and Css=0%. A summary of the results for the three above-referenced single segment cases appears in Table I, along with the results of several other single segment simulation runs.

In Table I, B1 indicates the peak value of the fundamental. The numbers shown in the B1 column represent the peak value of the fundamental as a percentage of the peak value of

TABLE I

| Layer | Conductors | Cs % | Cp % | Css % | Lag angle° | B0.5 % | B1 % | B3 % | B5 % | B7 % |
|---|---|---|---|---|---|---|---|---|---|---|
| 1 | 0 | 0 | 0 | 0 | 0 | 0 | 112.89 | 18.117 | 8.167 | 4.8699 |
|  | 2 | 0 | 0 |  |  | 0 | 112.16 | 16.756 | 6.972 | 3.7965 |
|  | 4 | 0 | 0 |  |  | 0 | 111.35 | 15.214 | 5.589 | 2.5000 |
|  | 6 | 0 | 0 |  |  | 0 | 110.47 | 13.522 | 4.018 | 1.0830 |
|  | 8 | 0 | 0 |  |  | 0 | 109.50 | 11.658 | 2.310 | −0.45 |
|  | 9 | 0 | 0 |  |  | 0 | 108.99 | 10.682 | 1.433 | −1.2061 |
|  | 10 | 0 | 0 |  |  | 0 | 108.46 | 9.660 | 0.518 | −1.9805 |
|  | 10.2 | 0 | 0 |  |  | 0 | 108.32 | 9.392 | 0.276 |  |
|  | 10.5 | 0 | 0 |  |  | 0 | 108.19 | 9.143 | 0.085 |  |
|  | 11 | 0 | 0 |  |  | 0 | 107.91 | 8.599 | −0.420 | −2.752 |
|  | 12 | 0 | 0 |  |  | 0 | 107.34 | 7.532 | −1.330 | −3.4535 |
|  | 13 | 0 | 0 |  |  | 0 | 106.76 | 6.425 | −2.258 | −4.1414 |
|  | 10 | 0 | 0 | 0 | 0 | 108.46 | 9.66 | 0.518 |  |  |
|  | 10 | 1 | 0 |  | −0.85 | 108.43 | 9.631 | 0.514 |  |  |
|  | 10 | 2 | 0 |  | −1.42 | 108.36 | 9.580 | 0.506 | −1.8919 |  |
|  | 10 | 3 | 0 |  | −2.27 | 108.21 | 9.455 | 0.488 | −1.759 |  |
|  | 10 | 4 | 0 |  | −2.84 | 108.06 | 9.341 | 0.472 | −1.642 |  |
|  | 10 | 5 | 0 |  | −3.69 | 107.78 | 9.126 | 0.441 |  |  |
|  | 10 | 6 | 0 |  | −4.26 | 107.56 | 8.953 | 0.418 |  |  |
|  | 10 | 7 | 0 |  | −5.11 | 107.16 | 8.653 | 0.378 |  |  |
|  | 10 | 8 | 0 |  | −5.95 | 106.70 | 8.307 | 0.334 |  |  |
|  | 10 | 7 | 0 | 0 | −5.11 | 107.16 | 8.653 | 0.378 | −1.064 |  |
|  | 10 | 7 | 1 |  | −5.13 | 107.62 | 8.769 | 0.324 |  |  |
|  | 10 | 7 | 2 |  | −5.15 | 108.02 | 9.380 | 0.240 |  |  |
|  | 10 | 7 | 3 |  | −5.17 | 108.37 | 9.137 | 0.147 |  |  |
|  | 10 | 7 | 4 |  | −5.19 | 108.70 | 9.356 | 0.056 |  |  |
|  | 10 | 7 | 5 |  | −5.20 | 108.99 | 9.588 | −0.027 |  |  |
|  | 10 | 7 | 6 |  | −5.22 | 109.27 | 9.828 | −0.101 |  |  |
|  | 10 | 7 | 8 |  | −5.25 | 109.77 | 10.326 | −0.209 |  |  |
|  | 10 | 7 | 10 |  | −5.27 | 110.21 | 10.829 | −0.262 |  |  |
|  | 8 | 2 | 0 | 0 | −1.45 | 109.4 | 11.561 | 2.256 | −0.43 |  |
|  | 8 | 3 | 0 |  |  |  |  |  |  |  |
|  | 8 | 4 | 0 |  | −2.32 | 109.24 | 11.410 | 2.175 | −0.40 |  |
|  | 8 | 5 | 0 |  | −2.90 | 109.10 | 11.273 | 2.102 | −0.374 |  |
|  | 8 | 6 | 0 |  | −4.34 | 108.59 | 10.804 | 1.861 | −0.2904 |  | the back emf waveform. Likewise, the numbers in the B3, B5 and B7 columns represent the peak value of the third, fifth and seventh harmonic as a percentage of the peak value of the back emf waveform, respectively.

Of special note in Table I is the column headed B0.5. This refers to a harmonic that appears in the cases where a magnet shift is applied. Referring back to FIG. 22A for an example of such a case, it can be seen that the back emf waveform is asymmetrical about the 360° point. Nevertheless, the waveform does repeat itself every 720°. For this reason, the waveform is said to contain a 0.5 ω component. That is to say, if at position X the 0.5 harmonic's value is K, its value at position X+360° is −K and the two values cancel each other out. In a motor constructed according to the present invention adjacent coils of a winding are very close to 360° apart, and therefore the 0.5 harmonic will effectively cancel itself out. Thus, as can be seen from Table I, the 0.5 harmonic is of little concern when trying to minimize torque ripple.

It should also be noted that in a three phase motor the third back emf harmonic effectively cancels itself out. Accordingly, the primary concern in reducing torque ripple is reduction of the 5th and 7th back emf harmonics.

Table II shows the magnitude of the back emf harmonics produced by a phase A winding (Z=129) built according to the present invention. Each entry in the table concerns a different Cs, Cp and Css combination, and includes, in addition to the back emf magnitudes, the maximum, minimum and peak to peak motor ripple for the subject Cs, Cp and Css combination. As can be seen from Table II, a nominal gap of at least 6% (Gap Factor, Cs=6%)

TABLE II

| Cs % | Cp % | Css % | B0.5 % | B1 % | B3 % | B5 % | ripple up % | ripple down % | ripple p—p % |
|---|---|---|---|---|---|---|---|---|---|
| 0 | 0 | 0 | 0 | 110.11 | 12.022 | 1.794 | 2.76 | −1.90 | 4.66 |
| 2 | 0 | 0 | 0 | 109.48 | 11.128 | 1.533 | 2.04 | −1.65 | 3.69 |
| 2 | 1 | 0 | −0.02 | 109.46 | 11.096 | 1.520 | 2.14 | −1.65 | 3.79 |
| 2 | 2 | 0 | −0.04 | 109.43 | 11.040 | 1.498 | 2.11 | −1.64 | 3.75 |
| 4 | 0 | 0 | 0 | 108.78 | 10.112 | 1.225 | 1.38 | −1.34 | 2.72 |
| 4 | 1 | 0 | −0.02 | 108.76 | 10.083 | 1.215 | 1.47 | −1.35 | 2.82 |
| 4 | 2 | 0 | −0.03 | 108.73 | 10.032 | 1.197 | 1.41 | −1.34 | 2.75 |
| 4 | 3 | 0 | −0.06 | 108.65 | 9.909 | 1.155 | 1.51 | −1.31 | 2.82 |
| 4 | 4 | 0 | −0.07 | 108.57 | 9.796 | 1.117 | 1.43 | −1.27 | 2.70 |
| 6 | 0 | 0 | 0 | 108.01 | 8.994 | 0.885 | 0.90 | −1.00 | 1.90 |
| 6 | 1 | 0 | −0.02 | 107.99 | 8.968 | 0.877 | 0.97 | −1.01 | 1.98 |

TABLE II-continued

| Cs % | Cp % | Css % | B0.5 % | B1 % | B3 % | B5 % | ripple up % | ripple down % | ripple p—p % |
|---|---|---|---|---|---|---|---|---|---|
| 6 | 2 | 0 | −0.03 | 107.96 | 8.923 | 0.865 | 0.93 | −1.00 | 1.93 |
| 6 | 3 | 0 | −0.05 | 107.88 | 8.814 | 0.834 | 0.87 | −0.98 | 1.85 |
| 6 | 4 | 0 | −0.07 | 107.81 | 8.714 | 0.807 | 0.92 | −0.95 | 1.87 |
| 6 | 5 | 0 | −0.09 | 107.68 | 8.524 | 0.756 | 0.98 | −0.90 | 1.88 |
| 6 | 6 | 0 | −0.10 | 107.57 | 8.371 | 0.716 | 0.95 | −0.86 | 1.81 |
| 8 |   | 0 | −0.00 | 107.17 | 7.762 | 0.509 | 0.59 | −0.61 | 1.20 |
| 8 |   | 0 | −0.02 | 107.15 | 7.740 | 0.505 | 0.63 | −0.62 | 1.25 |
| 8 | 2 | 0 | −0.03 | 107.12 | 7.701 | 0.498 | 0.64 | −0.61 | 1.25 |
| 8 | 3 | 0 | −0.05 | 107.05 | 7.607 | 0.480 | 0.56 | −0.60 | 1.16 |
| 8 | 4 | 0 | −0.07 | 106.98 | 7.521 | 0.464 | 0.51 | −0.58 | 1.09 |
| 8 | 5 | 0 | −0.09 | 106.85 | 7.357 | 0.435 | 0.50 | −0.55 | 1.05 |
| 8 | 6 | 0 | −0.10 | 106.75 | 7.226 | 0.412 | 0.53 | −0.52 | 1.05 |
| 8 | 7 | 0 | −0.12 | 106.58 | 6.998 | 0.373 | 0.51 | −0.47 | 0.98 |
| 8 | 8 | 0 | −0.14 | 106.44 | 6.826 | 0.345 | 0.57 | −0.49 | 1.06 |
| 10 | 0 |   | 0 | 106.25 | 6.438 | 0.114 | 0.46 | −0.70 | 1.16 |
| 10 | 1 |   | −0.02 | 106.24 | 6.42 | 0.113 | 0.51 | −0.72 | 1.23 |
| 10 | 2 |   | −0.03 | 106.21 | 6.388 | 0.112 | 0.51 | −0.69 | 1.20 |
| 10 | 3 |   | −0.05 | 106.14 | 6.310 | 0.108 | 0.45 | −0.52 | 0.97 |
| 10 | 4 |   | −0.07 | 106.08 | 6.239 | 0.104 | 0.43 | −0.52 | 0.95 |
| 10 | 5 |   | −0.09 | 105.96 | 6.104 | 0.098 | 0.35 | −0.35 | 0.70 |
| 10 | 6 |   | −0.1 | 105.87 | 5.995 | 0.093 | 0.34 | −0.42 | 0.76 |
| 10 | 7 |   | −0.12 | 105.70 | 5.807 | 0.084 | 0.28 | −0.32 | 0.60 |
| 10 | 8 |   | −0.14 | 105.51 | 5.589 | 0.074 | 0.32 | −0.37 | 0.69 |
|   |   |   | −0.15 | 105.36 | 5.428 | 0.068 | 0.38 | −0.50 | 0.88 |
| 10 | 10 |   | −0.17 | 105.20 | 5.256 | 0.061 | 0.40 | −0.49 | 0.89 |
| 12 | 0 |   | 0 | 105.27 | 5.025 | −0.294 | 0.53 | −1.24 | 1.77 |
| 12 | 1 |   | −0.02 | 105.26 | 5.011 | −0.291 | 0.58 | −1.24 | 1.82 |
| 12 | 2 |   | −0.03 | 105.23 | 4.986 | −0.287 | 0.59 | −1.19 | 1.78 |
| 12 | 3 |   | −0.05 | 105.17 | 4.926 | −0.277 | 0.55 | −1.07 | 1.62 |
| 12 | 4 |   | −0.07 | 105.11 | 4.870 | −0.268 | 0.59 | −1.03 | 1.62 |
| 12 | 5 |   | −0.08 | 105.00 | 4.765 | −0.251 | 0.54 | −0.80 | 1.34 |
| 12 | 6 |   | −0.10 | 104.91 | 4.681 | −0.238 | 0.54 | −0.72 | 1.26 |
| 12 | 7 |   | −0.12 | 104.76 | 4.534 | −0.216 | 0.55 | −0.66 | 1.21 |
| 12 | 8 |   | −0.14 | 104.58 | 4.364 | −0.191 | 0.55 | −0.61 | 1.16 |
| 10 | 7 | 0 | −0.12 | 105.70 | 5.807 | 0.084 | 0.28 | −0.32 | 0.60 |
| 10 | 7 | 2 | −0.12 | 105.87 | 5.96 | 0.053 | 0.29 | −0.34 | 0.63 |
| 10 | 7 | 3 | −0.12 | 106.00 | 6.081 | 0.032 | 0.30 | −0.35 | 0.65 |
| 10 | 7 | 4 | −0.12 | 106.14 | 6.216 | 0.012 | 0.31 | −0.37 | 0.68 |
| 10 | 7 | 5 | −0.12 | 016.31 | 6.363 | 0.006 | 0.32 | −0.38 | 0.70 |
| 10 | 7 | 6 | −0.12 | 106.49 | 6.516 | 0.022 | 0.33 | −0.40 | 0.73 |
| 10 | 7 | 7 | −0.12 | 106.67 | 6.676 | 0.035 | 0.34 | −0.41 | 0.75 | between adjacent poles is preferred and cuts the fifth and higher harmonics by at least a factor of two. The most preferred nominal gap between poles is approximately 10%. The higher odd harmonics can be further reduced by shifting some of the poles to provide an uneven spacing between adjacent poles. A preferred arrangement in an eight pole motor is to shift the adjacent poles of an opposed pair to reduce the gap between the adjacent poles. With a nominal gap of about 10%, for example, optimum results are achieved at a nominal shift of about 7% (Magnet Uneven Factor, Cp=7%).

The above-described gaping and shifting of rotor poles results in reduced winding back emf, which in turn results in reduced motor torque ripple. Accordingly, a Gap Factor of 6–11% and a Magnet Uneven Factor of about 7% is desirable in the preferred embodiment.

I claim:

1. A brushless axial airgap electric motor, comprising:
   a rotor having a plurality of permanent magnet poles;
   a stator winding having
      a plurality of conductor layers, each of said conductor layers including a plurality of generally radial flat conductors each extending between an inner tap and an outer tap, said inner taps being located at the inner diameter of said winding and said outer taps being located at the outer diameter of said winding, all of said inner taps of on of said conductor layers being interconnected with inner taps of another conductor layer, and a plurality of said outer taps of one of said conductor layers being interconnected with a plurality of said outer, taps of another conductor layer, leaving a plurality of free outer taps;
   a connecting layer without any substantial radial conductors within the field of said permanent magnet poles for interconnecting said free outer taps to form said stator winding and for providing terminations therefor;
   wherein spacings for connections to said connecting layer are achieved by having more tap spaces at the outer diameter than are used at the inner diameter and;
   magnetic material providing a stator flux return path.

2. A brushless axial airgap electric motor according to claim 1 wherein said free outer taps are welded to taps in said connecting layer and other taps are welded to taps in said conductor layers.

3. A brushless axial airgap motor according to claim 1 wherein said free outer taps are created by removing selected ones of said radial conductors in said conductor layers and said free outer taps are welded to taps in said connecting layer.

4. A brushless axial airgap motor according to claim 1 wherein said stator includes four conductor layers.

5. A brushless axial airgap motor according to claim 4 wherein at least said generally radial flat conductors of two of said conductor layers are interconnected in a wave configuration.

6. A brushless axial airgap motor according to claim 4 wherein at least said generally radial flat conductors of two of said conductor layers are interconnected in a lap configuration.

7. A brushless axial airgap electric motor according to claim 1 wherein said free outer taps are interconnected by said connecting layer to form a three phase winding configuration.

8. A brushless axial airgap electric motor according to claim 1 including twelve free outer taps interconnected by said connecting layer to form a three phase winding configuration.

9. A brushless axial airgap electric motor according to claim 1 wherein said rotor has eight poles, the winding configuration is progressive, and the number of radial conductors per conductor layer is 105, 129, 153, 177, or 201.

10. A brushless axial airgap electric motor according to claim 1 wherein said rotor has eight poles, the winding configuration is retrogressive, and the number of radial conductors per conductor layer is 111, 135, 159, or 183.

11. A brushless axial airgap electric motor according to claim 1 wherein each of said generally radial flat conductors includes a radial segment and arcuate segments connecting said radial segment to said inner and outer taps.

12. A brushless airgap electric motor according to claim 11 wherein said conductor layers are incremental stamped patterns with all generally radial flat conductors of a conductor layer having the same configuration and two of said layers being mirror images of one another in the assembled motor.

13. A brushless axial airgap, electric motor, comprising:
 a rotor having a plurality of permanent magnet poles;
 a stator winding having
  a plurality of conductor layers, each of said conductor layers including a plurality of generally radial flat conductors between an inner tap and an outer tap, said inner taps being located at the inner diameter of said winding, and said outer taps being located at the outer diameter of said winding, all of said inner taps of one of said conductor layers being interconnected with inner taps of another conductor layer, and
  a plurality of said outer taps of one of said conductor layers being interconnected with a plurality of said outer taps of another conductor layer, leaving a plurality of free outer taps by removing selected ones of said radial conductors in said conductor layers;
 a connecting layer without any substantial radial conductors within the field of said permanent magnet poles for interconnecting said free outer taps to form said stator winding and for providing terminations therefor;
 wherein spacing for connections to said connecting layer are achieved by having more tap spaces at the outer diameter than are used at the inner diameter;
 and magnetic material providing a stator flux return path.

14. A brushless axial airgap motor according to claim 13 wherein said stator includes four conductor layers.

15. A brushless axial airgap motor according to claim 14 wherein at least said generally radial flat conductors of two of said conductor layers are interconnected in a wave configuration.

16. A brushless axial airgap motor according to claim 14 wherein at least said generally radial flat conductors of two of said conductor layers are interconnected in a lap configuration.

17. A brushless axial airgap electric motor according to claim 13 wherein said free outer taps are interconnected by said connecting layer to form a three phase winding configuration.

18. A brushless axial airgap electric motor according to claim 13 including twelve free outer taps interconnected by said connecting layer to form a three phase winding configuration.

19. A brushless axial airgap electric motor, comprising:
 a rotor having a plurality of permanent magnet poles;
 a stator winding having
  a plurality of conductor layers each of said conductor layers including a plurality of generally radial flat conductors, each extending between an inner tap and an outer tap, said inner taps being located at the inner diameter of said winding, and said outer taps being located at the outer diameter of said winding, all of said inner taps of one of said conductor layers being interconnected with inner taps of another conductor layer, and a plurality of said outer taps of one of said conductor layers being interconnected with a plurality of said outer taps of another conductor layer, leaving a plurality of free outer taps by having a greater number of outer tap positions than inner tap positions;
 a connecting layer without any substantial radial conductors within the field of said permanent magnet poles for interconnecting said free outer taps to form said stator winding and for providing terminations therefor;
 wherein spacing for connections to said connecting layer are achieved by having more tap spaces at the outer diameter than are used at the inner diameter; and
 magnetic material providing a stator flux return path.

20. A brushless axial airgap motor according to claim 19 wherein said stator includes four conductor layers.

21. A brushless axial airgap motor according to claim 20 wherein at least said generally radial flat conductors of two of said conductor layers are interconnected in a wave configuration.

22. A brushless axial airgap motor according to claim 20 wherein at least said generally radial flat conductors of two of said conductor layers are interconnected in a lap configuration.

23. A brushless axial airgap electric motor according to claim 19 wherein said free outer taps are interconnected by said connecting layer to form a three phase winding configuration.

24. A brushless axial airgap electric motor according to claim 19 including twelve free outer taps interconnected by said connecting layer to form a three phase winding configuration.

* * * * *